US006741553B1

(12) United States Patent
Grenier

(10) Patent No.: US 6,741,553 B1
(45) Date of Patent: May 25, 2004

(54) METHOD AND SYSTEM FOR PROTECTING VIRTUAL TRAFFIC IN A COMMUNICATIONS NETWORK

(75) Inventor: Guy-Laval Grenier, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/456,566

(22) Filed: Dec. 8, 1999

(51) Int. Cl.[7] ............... G01R 31/08; G06F 11/00; G08C 15/00; H04J 1/16; H04J 3/14
(52) U.S. Cl. ............... 370/218; 370/227; 370/228
(58) Field of Search ............... 370/225–228, 370/216–229; 340/825.01; 714/1, 2; 709/239

(56) References Cited

U.S. PATENT DOCUMENTS

| | | | | |
|---|---|---|---|---|
| 6,353,593 B1 | * | 3/2002 | Chen et al. | 370/216 |
| 6,359,857 B1 | * | 3/2002 | Ahmad et al. | 370/217 |
| 6,392,992 B1 | * | 5/2002 | Phelps | 370/225 |
| 6,426,941 B1 | * | 7/2002 | Vaman et al. | 370/228 |

OTHER PUBLICATIONS

Serge Asselin & David Martin, ATM Protection Switching of Virtual Path Groups Using APS Channels, Sep. 16–19, 1996, p. 1–9.

Michel Bonnifait & Hiroshi Ohta, Draft New Recommendation 1.630 (ex. 1.ps), Jun. 1998, p. 1–36.

Michel Bonnifait & Hiroshi Ohta, Draft Revised Recommendation 1.610 (B–ISDN Operation and Maintenance Principles and Functions), Jun. 1–12, 1998, all pages.

\* cited by examiner

*Primary Examiner*—Ricky Ngo
*Assistant Examiner*—Yvonne Q. Ha

(57) ABSTRACT

A method and system for protecting virtual traffic travelling through a protected domain having of a bridge node connected to a selector node in working and protection paths. Upon detecting failure of the traffic channels in the working path, the detecting node transmits failure information to the selector node along the traffic channels and along an alarm channel in the working path. The selector node initiates protection switching of the traffic channels as soon as failure information is received along the alarm channel. The alarm channel has a sufficiently high priority relative to the traffic channels that protection switching is initiated before failure information is received along the traffic channels. Thus, the selector node can initiate protection switching before receiving alarm cells on traffic channels, which significantly reduces the time during which the traffic channels contain alarm cells. Advantageously, the invention helps prevent premature termination of the end-to-end traffic connection.

14 Claims, 26 Drawing Sheets

METHOD AND SYSTEM FOR PROTECTING VIRTUAL TRAFFIC IN A COMMUNICATIONS NETWORK

FIELD OF THE INVENTION

The present invention relates generally to protection switching and to mechanisms for protecting end-to-end communications at the traffic layer. In particular, the invention is concerned with techniques for allowing fast initiation of protection switching within a protected domain of a communications network.

BACKGROUND OF THE INVENTION

Asynchronous Transfer Mode (ATM) is increasingly becoming the traffic layer of choice for transmitting information among nodes in a network. Better known by its acronym, ATM is a cell-based switching and multiplexing technology designed to be a general-purpose, connection-oriented transfer mode for a wide range of services. The basic building block of an ATM network is the ATM cell.

Each ATM cell sent into the network contains addressing information that establishes a virtual connection from origination node to destination node. Different ATM virtual connections may share the same physical link but belong to different classes of traffic, such as constant bit rate (CBR), variable bit rate (VBR) or unspecified bit rate (UBR). As a result, ATM has the ability to accommodate data and voice traffic having varying bandwidth and quality of service requirements.

ATM traffic can travel between end points along one or more virtual channel connections (VCCs). Different VCCs may thus share the same origination and destination nodes but may be associated with their own quality of service and bandwidth requirements. Also, as is known in the ATM art, several VCCs can be associated with a single virtual path connection (VPC), which defines a unidirectional flow of ATM cells from one end user to another. Moreover, it is possible to define multiple VPCs between two end points, each of which can be associated with multiple corresponding VCCs.

In many situations, such as when high reliability is required, it becomes necessary to protect end-to-end ATM traffic in the event of a failure. Accordingly, the art has seen the development of switching mechanisms for protecting individual VPCs/VCCs. This may consist of providing a protected domain between the origination node and the destination node.

The protected domain typically consists of a bridge node for sending traffic along a working path and/or along a physically diverse protection path. At the other end of the protected domain is a selector node, for selecting either the traffic from the working path or the traffic from the protection path. The selected traffic is passed onwards to the destination node. Thus, although the working path may fail for a given VPC/VCC, the VPC/VCC need not be dropped entirely if the protection path is functional and available.

However, as the number of virtual connections (VPCs/VCCs) that can be accommodated on a single physical link increases, it becomes prohibitively complex to individually protect the hundreds and possibly thousands of connections which share the working path through the protected domain.

In recognition of this difficulty, a bundling concept has been introduced, whereby connections traversing the same physical route are protected as a group. For example, multiple VCCs and VPCs having the same source and end points within the protected domain can be associated with a single virtual path group/virtual circuit group (VPG/VCG). This simplifies the task of protecting a large number of connections.

One such protection scheme is described in a document entitled "ITU-T Recommendation I.630, ATM Protection Switching", published by the International Telecommunications Union (ITU) Telecommunication Standardization Sector in March, 1999 and hereby incorporated by reference herein.

Specifically, recommendation I.630 discusses the use of an automatic protection switching (APS) channel in both the working and protection paths. The APS channel is a virtual connection for control purposes, defined over the extent of the protected domain and contained within a VPG/VCG. Its purpose is to assist in evaluating the quality of the VPG/VCG and to serve as a conduit for protection switching control protocol messages.

Using the method disclosed in recommendation I.630, a node detecting a failure inserts alarm messages into all the VPCs/VCCs of the group, including the APS channel. The selector node of the protection domain receives these alarm messages and initiates protection switching, while forwarding alarm messages to the destination node outside the protected domain. Of course, the end-to-end connection undergoes an interruption during the time when alarm messages are being received by the destination node.

In many cases, the number of VPCs/VCCs in the group and the distance separating the node detecting the failure from the selector node can be considerable. This results in a lengthy delay in the selector node receiving the alarm message over the APS channel, correspondingly resulting in a lengthy delay before protection switching is initiated and eventually completed. Thus, because current configurations lack an ATM-layer mechanism for immediately alerting the selector node of the occurrence of a failure, the selector node may have to wait a considerable amount of time before initiating the protection switching operation. This results in the destination node unnecessarily experiencing an interruption of the end-to-end connection.

Many deleterious effects can arise from delayed reaction to a failure condition. These include, but are not limited to, unnecessary loss of data and a failure condition being signalled to higher layers of the protocol. Consequently, there may result premature rerouting or termination of the connection.

Clearly, it would be desirable to provide a technique of initiating group protection switching more quickly than can be achieved using existing methods such as those disclosed in recommendation I.630.

SUMMARY OF THE INVENTION

According to the invention, the APS channel is assigned a higher priority than any of the traffic channels. This results in faster initiation of protection switching, as alarm messages are received on the APS channel before they are received on the traffic channels. Thus, protection switching can be started before the traffic channels have a chance to leave the protected domain carrying an alarm message.

Thus, a head-start is given to the protection switching mechanism, resulting in a shortening of the period during which the traffic channels carry alarm messages outside the protected domain. In some cases, protection switching can be completed even before the traffic channels have a chance to leave the protected domain carrying an alarm message.

Therefore, the invention may be summarized broadly as a method of protecting a group of traffic channels travelling through a protected domain. The protected domain includes a bridge node, a selector node and a plurality of other nodes arranged in a working path and in a protection path between the bridge node and the selector node. According to the invention, the method includes a node in the working path detecting failure of the traffic channels, after which the node transmits failure information to the selector node along the traffic channels and along an alarm channel in the working path.

Upon receipt of said failure information by the selector node along said alarm channel, the selector node initiates protection switching of the traffic channels. According to the invention, the alarm channel has a sufficiently high priority relative to the traffic channels to allow the selector node to initiate protection switching before failure information is received along any of the traffic channels.

Preferably, the traffic channels contain ATM virtual path connections or virtual channel connections and the alarm channel is an ATM virtual path connection or virtual channel connection.

The invention is applicable to a 1+1 protection scenario and to a 1:1 protection scenario. In a 1+1 protection scenario, the traffic channels travel through the protected domain along both the working path and the protection path prior to failure detection, and the selector node performs protection switching by selecting the traffic channels arriving along the protection path. In a 1+1 protection scenario, if the priority of the alarm channel is sufficiently high, the selector node can complete protection switching even before failure information is received on any of the traffic channels.

In a 1:1 protection scenario, the traffic channels travel through the protected domain along only the working path prior to failure detection. Protection switching is performed by the selector node transmitting a message to the bridge node along a second alarm channel in the protection path, the bridge node receiving the message and responding thereto by sending the traffic channels along the protection path and the selector node selecting the traffic channels arriving along the protection path.

The invention can also be summarized broadly as an intermediate node for connection in the working path of a protected domain. The intermediate node includes a unit for receiving traffic cells from a previous node and forwarding the received traffic cells to a next node, a unit for detecting a failure to receive traffic cells from the previous node and a unit for generating alarm cells and transmitting them to the next node in response to detecting a failure. The alarm cells contain failure information and have a higher priority than any of the traffic cells.

Moreover, the invention can be summarized broadly as an article of manufacture, including a computer usable medium having computer readable program code embodied therein for protecting of a group of traffic channels travelling through a protected domain. The computer readable program code in the article of manufacture includes computer readable program code for causing a computer to receive traffic cells from a previous node and forward the received traffic cells to a next node, computer readable program code for causing the computer to detect a failure to receive traffic cells from the previous node and computer readable program code for causing the computer to generate alarm cells and transmit said alarm cells to the next node in response to detecting a failure, wherein the alarm cells contain failure information and have a higher priority than any of the traffic cells.

The invention can also be summarized broadly as a selector node for connection at the end of a working path and at the end of a protection path in a protected domain. The selector includes a unit for receiving user information from a previous node in the working path along a plurality of working traffic channels and forwarding said user information to a node outside the protected domain. As well, the selector node includes a unit for receiving failure information from the previous node in the working path along a working alarm channel, where the working alarm channel has a higher priority than any of the working traffic channels. Finally, the selector node contains a unit for initiating protection switching immediately upon receipt of failure information along the working alarm channel.

Also, the invention may be summarized broadly as an article of manufacture which includes a computer usable medium having computer readable program code embodied therein. The code includes a portion for causing a computer to receive user information from a previous node in the working path along a plurality of working traffic channels and to forward the user information to a node outside the protected domain. As well, the code includes a portion for causing the computer to receive failure information from the previous node in the working path along a working alarm channel, where working alarm channel has a higher priority than any of the working traffic channels. Finally, the code contains a portion for causing the computer to initiate protection switching immediately upon receipt of failure information along the working alarm channel.

The invention may also be broadly summarized as a protected domain having a bridge node, a selector node and a plurality of intermediate nodes arranged in a working path and in a protection path, where the various nodes are adapted to perform any of the above methods.

Because the working alarm channel is given a higher priority than any of the traffic channels, protection switching can be initiated by the selector node prior to the receipt of alarm cells on any of the traffic channels. While there may be a period during which the traffic channels contain alarm cells, fast initiation of protection switching allows this period to be significantly reduced relative to that resulting from a conventional protection switching approach. As a result, the premature termination of the end-to-end traffic connection is prevented.

BRIEF DESCRIPTION OF THE DRAWINGS

These and other aspects and features of the present invention will now become apparent to those of ordinary skill in the art upon review of the accompanying description of specific embodiments of the invention in conjunction with the following drawings, in which.

DETAILED DESCRIPTION OF THE PREFERRED EMBODIMENTS

Figure 1:
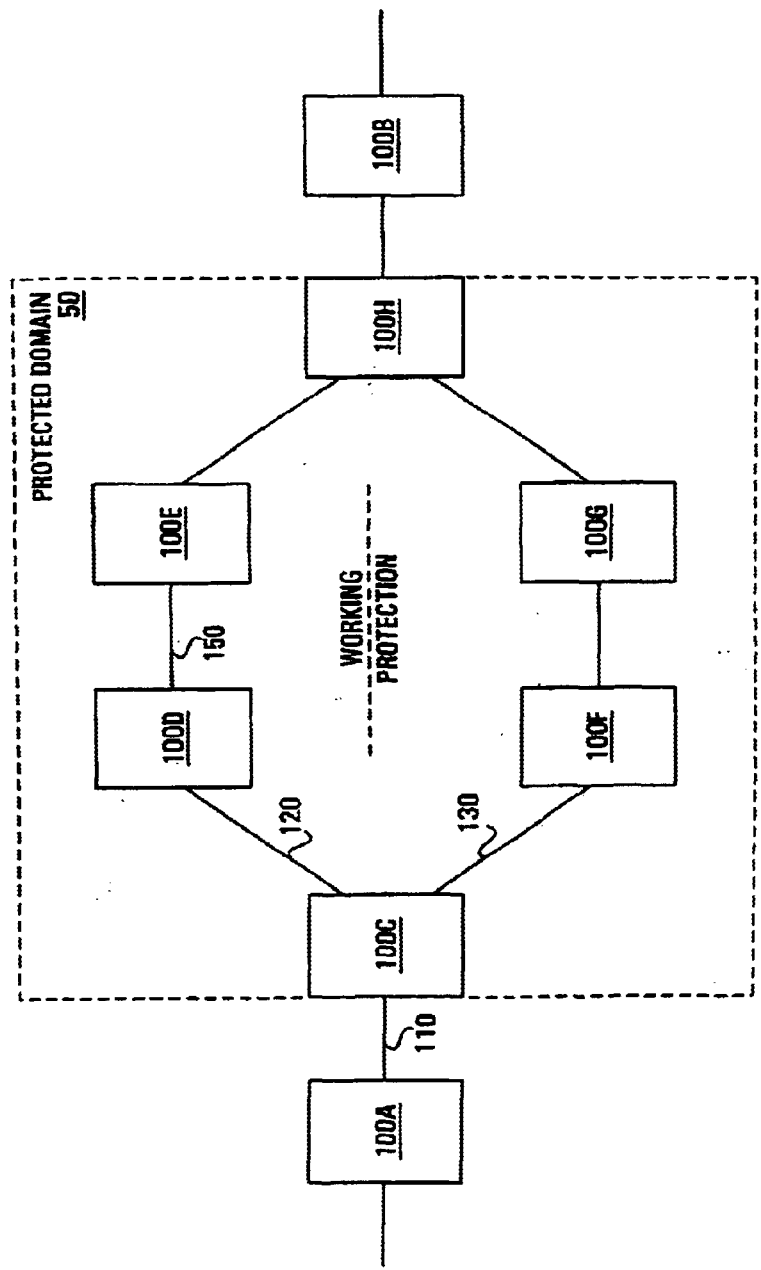
FIG. 1 is a block diagram of a network including two end nodes and a protected domain.

FIG. 1 shows a network consisting of a plurality of interconnected network elements (or nodes) 100A–100H. The physical connections between the network elements could be optical fiber cables, coaxial cables, copper twisted pairs or wireless (e.g., radio) links. Network elements 100A and 100B are "end nodes" and represent the termination points of an end-to-end traffic connection. Network elements 100C, 100D, 100E, 100F, 100G and 100H constitute what is commonly referred to as a "protected domain" 50, which offers physically diverse working and protection paths for the portion of the end-to-end traffic connection passing through the protected domain 50.

The network of FIG. 1 is used to carry virtual traffic from end node 100A to end node 100B or vice versa or both. A suitable type of virtual traffic is ATM traffic. In the interest of simplicity, but without intending to limit the scope of the invention, it will hereinafter be assumed that virtual traffic only travels in the direction from left to right, i.e., from end node 100A to end node 100B.

Within the protected domain, network element 100C, which is connected to end node 100A, is known as a bridge node. The bridge node 100C is connected to an intermediate node 100D in a working path and to another intermediate node 100F in a protection path. The bridge node 100C comprises circuitry, software and/or control logic for allowing traffic arriving from end node 100A to travel either along the working path or along the protection path or both simultaneously.

In the working path, intermediate node 100D is connected to intermediate node 100E, which is connected to network element 100H. Similarly, intermediate node 100F in the protection path is connected to intermediate node 100G, which is also connected to network element 100H. Although shown as being symmetrical, the working and protection paths need not have a similar structure, as long as they provide physically diverse paths through the protected domain 50.

Intermediate nodes 100D, 100E, 100F and 100G each comprise circuitry, software and/or control logic for detecting failures on the link joining the intermediate node in question with the preceding network element (relative to the direction of traffic flow).

Network element 100H is connected to end node 100B and is known as a selector node. The selector node 100H is equipped with circuitry, software and/or control logic for controllably selecting the traffic arriving from either intermediate node 100E in the working path or intermediate node 100G in the protection path. The selected traffic is forwarded to end node 100B.

The traffic originating at end node 100A and having end node 100B as a destination can take on the form of a set of ATM virtual path connections (VPCs) or virtual channel connections (VCCs). These are defined on an end-to-end basis between end node 100A and end node 100B. Each end-to-end VPC/VCC can be referred to as a traffic channel and is associated with one of a plurality of pre-defined traffic classes, including constant bit rate (CBR), unspecified bit rate (UBR), etc.

Figure 2:
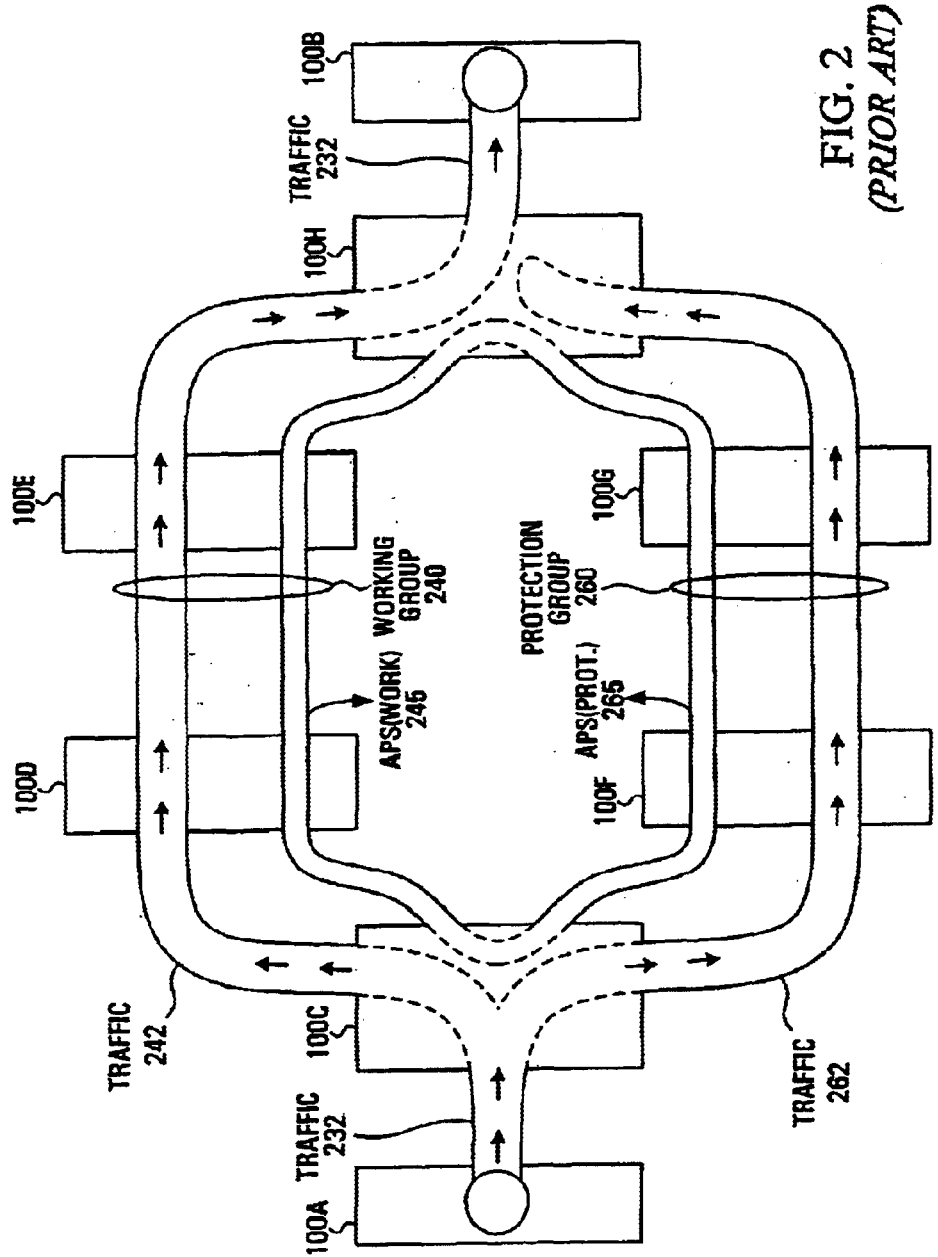
FIG. 2 is a logical view of the network in which channels are defined, for the case of 1+1 protection and unidirectional traffic flow.

FIG. 2 shows, at the ATM layer, the flow of traffic from end node 100A to end node 100B in the case of a 1+1 protection scenario during normal operation. A plurality of traffic channels 232 starts at end node 100A and terminates at end node 100B. At the bridge node 100C, the traffic channels 232 are bundled into two groups, namely a working group 240 and a protection group 260. Working group 240 and protection group 260 could each be a VPG/VCG as known in the art.

The working group 240 contains a set of traffic channels 242 and at least one control channel 245. The traffic channels 242 are identical to the traffic channels 232. The control channel 245, which can be referred to as an automatic protection switching (APS) channel, is reserved for use only by network elements along the working path within the protected domain 50. For clarity, the APS channel 245 in the working group 240 is termed a working APS channel. The working APS channel could be unidirectional (in the same direction as the traffic flow) or bi-directional.

Similarly, the protection group 260 contains a set of traffic channels 262 and at least one protection APS channel 265. The traffic channels 262 are identical to the traffic channels 232. The protection APS channel 265 is optional in the case of 1+1 protection and, if used, it is reserved for use only by network elements along the protection path within the protected domain 50.

The working group 240 travels through intermediate nodes 100D and 100E, while the protection group 260 travels through intermediate nodes 100F and 100G. The same physical link can be used for carrying the traffic channels 242 and the working PS channel 245 in working group 240. The transport layer used for carrying the traffic channels 242 and the working APS channel 245 can be independent of the traffic layer. For example, the transport layer could be synchronous (e.g., SONET, SDH) or asynchronous (e.g., Ethernet).

In the case of SONET, which uses frames each having an overhead portion and a payload portion, the payload portion could be used to carry ATM cells belonging to the traffic channels 242 as well as ATM cells belonging to APS channel 245. Similarly, any suitable transport mechanism can be used for carrying the traffic channels 262 and the protection APS channel 265 over the same physical link.

According to the preferred embodiment of the present invention, the working APS channel 245 is assigned a higher priority than any of the traffic channels 242 in the working group 240. Similarly, the protection APS channel 265 is assigned a higher priority than any of the traffic channels 262 in the protection group 260. Prioritization can be done in many ways, one of which is now described with further reference to FIG. 3.

Figure 3:
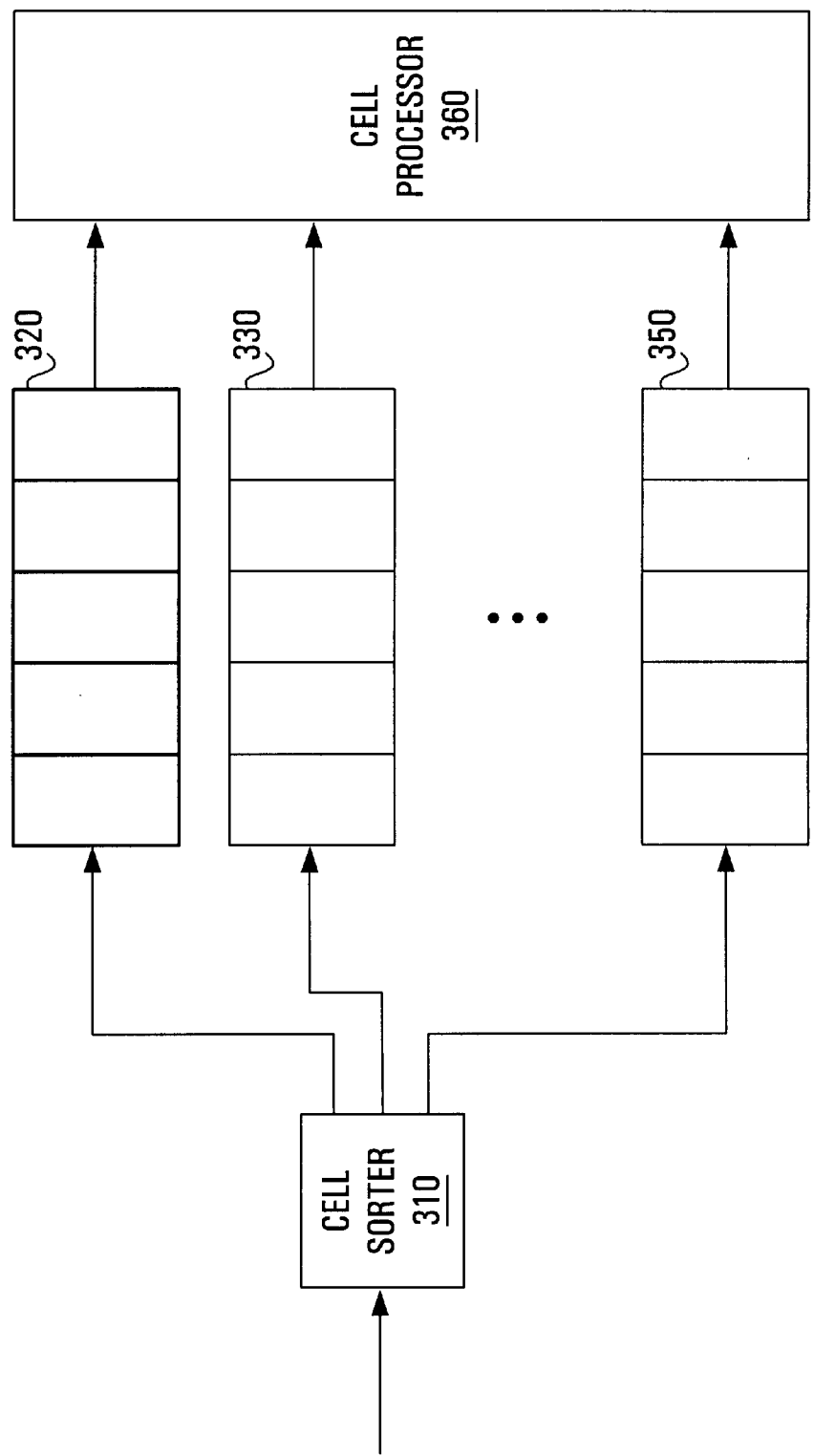
FIG. 3 is a block diagram of one possible implementation for prioritizing a set of virtual channels according to the preferred embodiment of the invention.

Thus, FIG. 3 shows the input end of a node, such as intermediate node 100D, 100E, 100F or 100G. Without loss of generality, FIG. 3 can be assumed to represent the input end of intermediate node 100E. An ATM cell stream 305 arrives at a cell sorter 310 from intermediate node 100D. The ATM cell stream 305 is associated with working group 240 and thus contains cells from traffic channels 242 and working APS channel 245.

The cell sorter 310 contains circuitry or software for examining each cell and placing it into one of a plurality of input queues 320, 330, 350. The decision regarding which queue a cell is placed into is a function of the cell's priority, which can be specified by a code in the cell's header. Preferably, one of the queues is reserved for holding only hose cells arriving along the working APS channel 245. Without loss of generality, this "APS queue" can be chosen to be queue 320, which has been bolded in FIG. 3.

The input queues 320, 340, 350 are connected to a cell processor 360 which could be a router, for example. The cell processor 360 may be a software or hardware entity. In any event, the cell processor 360 is programmed to process all cells in the APS queue (in this case queue 320) before reading from any other queue. In hardware/firmware, this can be done in the form of an interrupt which triggers an interrupt service routine as soon as a cell is placed in the APS queue 320. In software, the appropriate processing order to be performed by the cell processor 360 can be achieved by programming a loop which always ensures that the APS queue 320 is empty before accepting a cell from any other queue.

Operation of the bridge node 100C, of intermediate nodes 100D, 100E and of the selector node 100H is now described for the case in which the protected domain 50 provides 1+1 protection of traffic travelling from end node 100A to end node 100B. Those skilled in the art will recognize that the various operational steps can be implemented in hardware by a specific set of gates or they can be encoded as instructions in the software or firmware of the appropriate network element.

The bridge node 100C accepts cells arriving from end node 100A along traffic channels 232. These cells are duplicated and sent out onto traffic channels 242 in the working group 240 and also onto traffic channels 262 in the protection group 262. Under normal operating conditions, intermediate nodes 100D and 100E accept cells arriving from the previous network element along the traffic channels 242 in the working group 240. These cells are sent along the traffic channels 242 to the next network element. In the case of a 1+1 protection scenario, the behaviour of intermediate nodes 100F and 100G is identical to that of intermediate nodes 100E and 100F except, of course, hat traffic channels 262 are involved.

Still under normal operating conditions, the selector node 100H receives the two streams of traffic cells, one from intermediate node 100E along traffic channels 242 and one from intermediate node 100G along traffic channels 262. Only one of these streams is forwarded to end node 100B along traffic channels 232, which continue outside the protected domain. Preferably, under normal operating conditions, the selector node 100H chooses the cells in traffic channels 242 for transmission to end node 100B, although it could just as easily choose the cells in traffic channels 262.

Normal operation of the intermediate nodes 100D, 100E and of the selector node 100H may be interrupted by the arrival of cells on the high-priority working APS channel 245. In addition, an interrupt or error condition may result from the detection of a fault on the link joining an intermediate node to the previous network element in the protection domain.

Figure 4A:
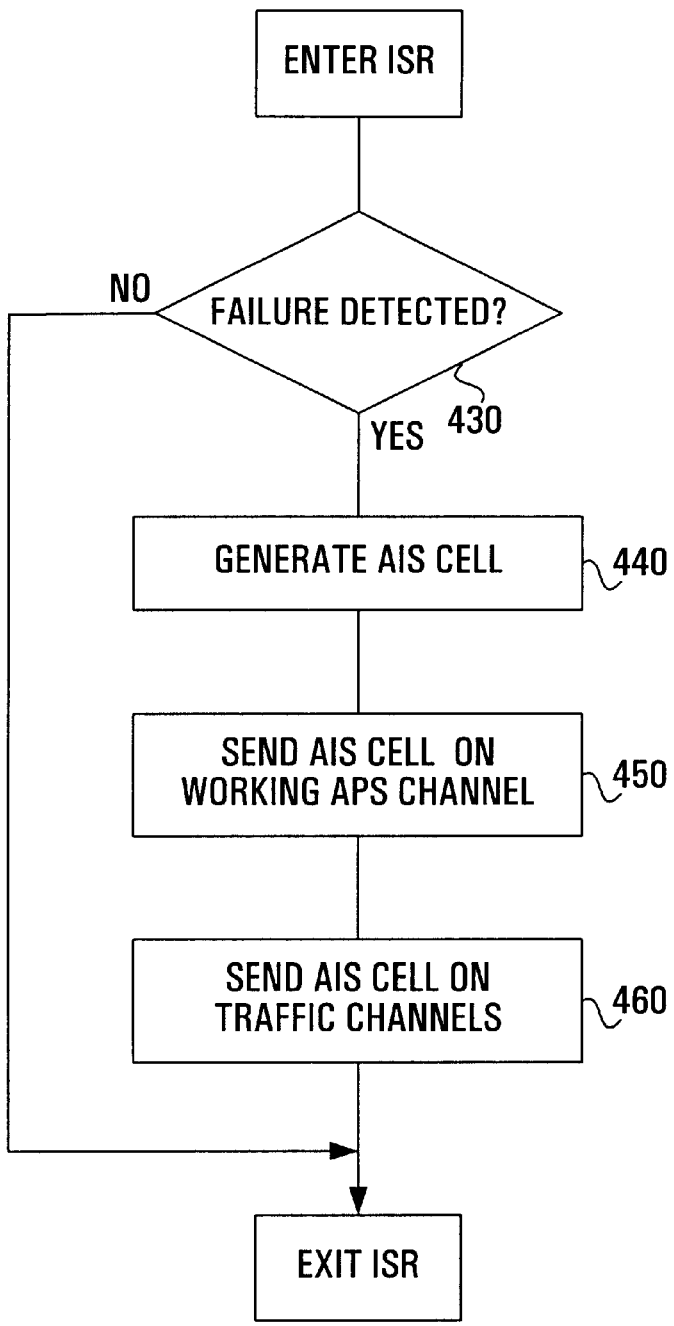
FIG. 4A is a flowchart illustrating operation of one type of intermediate node in a 1+1 protection scenario, according to a preferred embodiment of the invention.
Figure 4B:
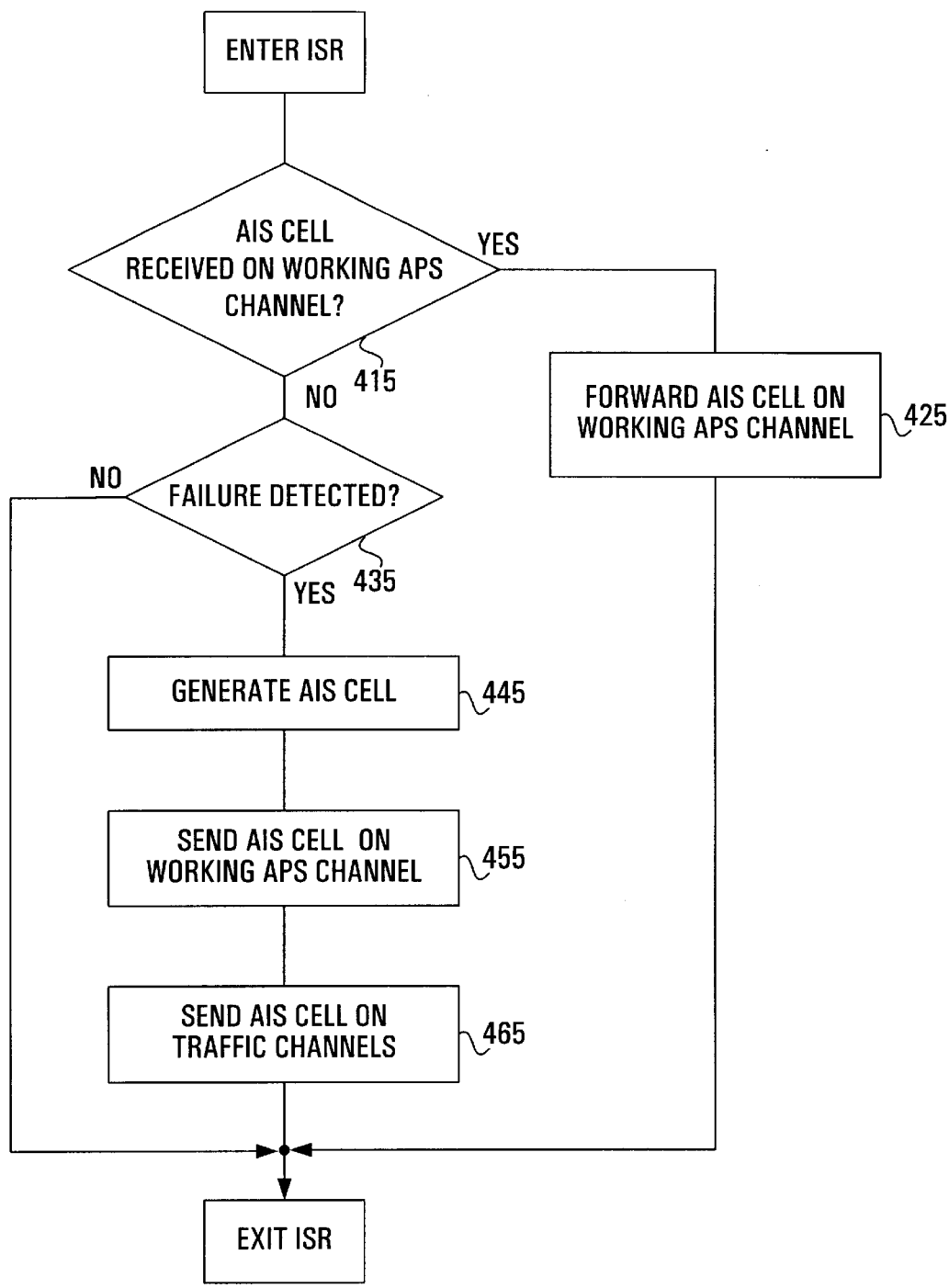
FIG. 4B is a flowchart illustrating operation of another type of intermediate node in a 1+1 protection scenario, according to the preferred embodiment of the invention.
Figure 5:
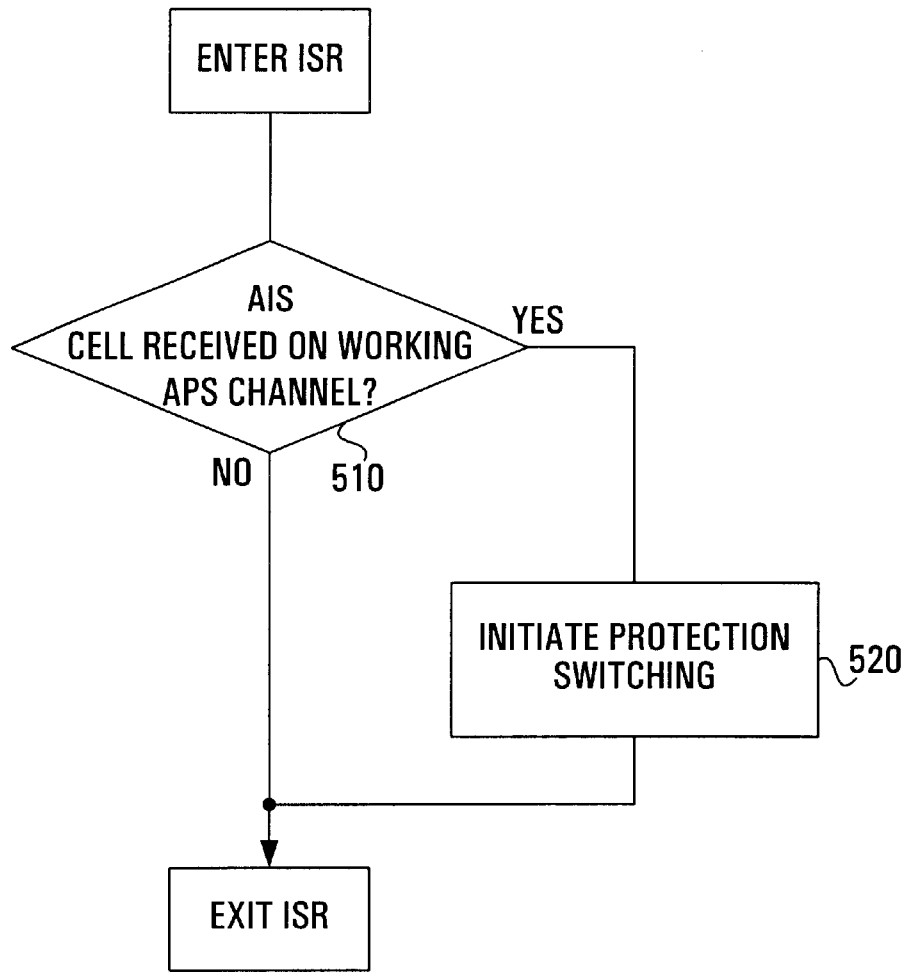
FIG. 5 is a flowchart illustrating operation of a selector node in a 1+1 protection scenario, according to the preferred embodiment of the invention.

FIG. 4A shows a flowchart of an interrupt service routine (ISR) which can be executed by intermediate node 100D in the event of an interruption of its normal operational flow. Similarly, FIG. 4B shows a flowchart of an ISR which can be executed by intermediate node 100E in the event of an interruption of its normal operational flow. Finally, FIG. 5 shows a flowchart of an ISR which could be used to handle interrupts resulting from the arrival of a high-priority cell along working APS channel 245. The reference to interrupts suggests a hardware or firmware implementation but it should be understood that a software implementation is just as viable.

With reference to FIG. 4A, at step 430, intermediate node 100D checks to see whether the interrupt is due to a failure and, if so, intermediate node 100D generates a special ATM cell known as an "alarm indication signal" (AIS) cell (step 440). The AIS cell is inserted into all the VPCs/VCCs of the working group 240, starting with the working APS channel 245 (step 450) and followed by the traffic channels 242 (step 460). As previously discussed the working APS channel is assigned a higher priority than any of the traffic channels 242. For example, this can be done by inserting a special code in the header of each AIS cell.

With reference to FIG. 4B, at step 415, intermediate node 100E checks to see whether the interrupt is caused by the arrival of a high-priority cell along the working APS channel 245. If so, this high-priority cell could be an AIS cell generated by intermediate node 100D. At step 425, the high-priority cell is the next cell to be forwarded to the selector node 100H, without regard to the number of traffic cells that may be awaiting transmission. This guarantees that the high-priority cell maintains its priority status.

On the other hand, if the interrupt is caused by a failure rather than by the arrival of a high-priority cell (step 435), then intermediate node 100E itself generates an AIS cell (step 445). This locally generated AIS cell is inserted into all the VPCs/VCCs of the working group 240, starting with the working APS channel 245 (step 455) and followed by the traffic channels 242 (step 465).

Finally, with reference to FIG. 5, at step 510, the selector node 100H verifies whether the interrupt is caused by the arrival of an AIS cell on the working APS channel 245. If so, then protection switching is initiated (step 520), meaning that the circuitry and/or software in the selector node 100H is instructed to begin accepting cells received on the traffic channels 262 in the protection group 260 and forwarding these cells to end node 100B.

Figure 6:
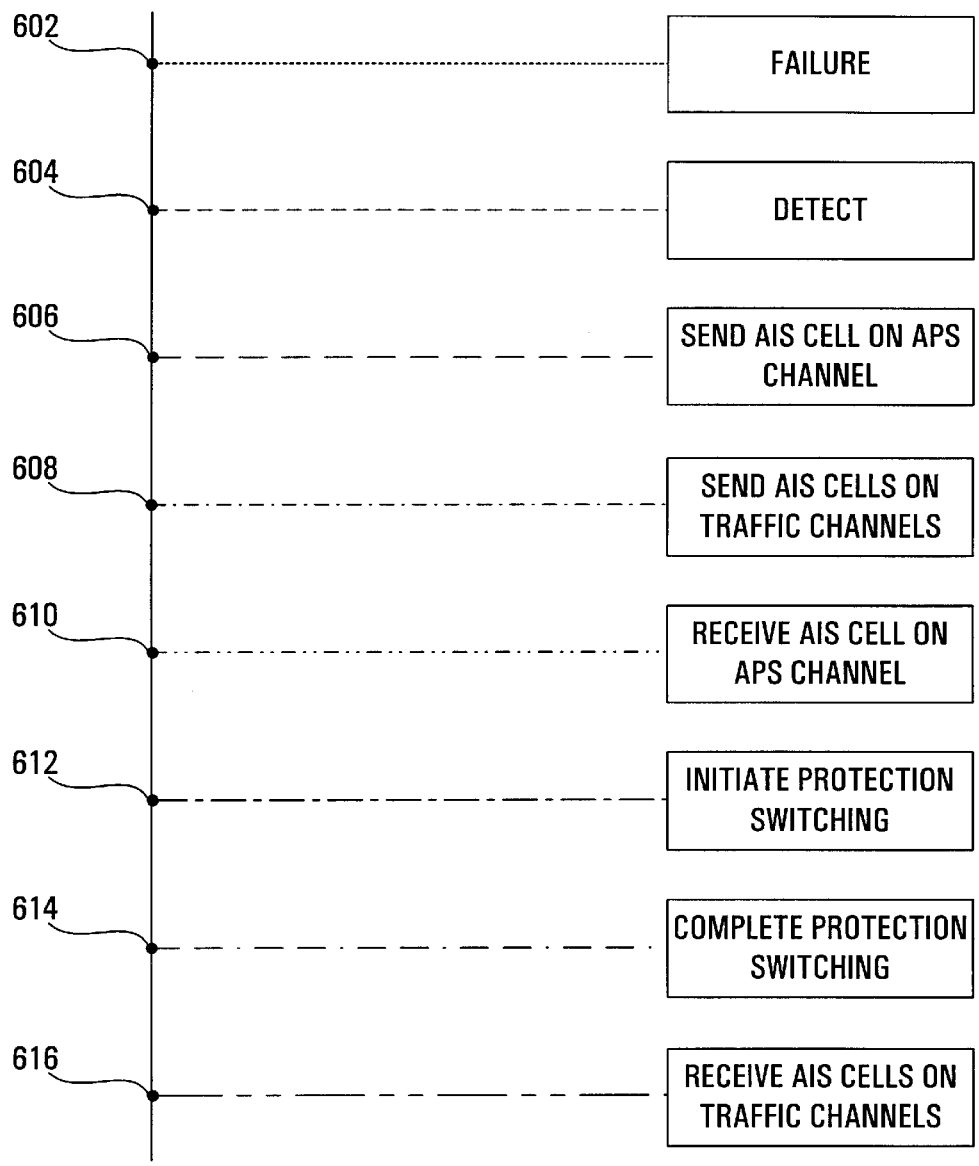
FIG. 6 is a time line illustrating operation of various nodes in the protected domain after occurrence of a fault in a 1+1 protection scenario, according to the preferred embodiment of the invention.

The benefits of the present invention in the case of a 1+1 protection scenario will now become apparent upon consideration of joint operation of the various nodes in the protection domain 50. To this end, continued reference is made to the flowcharts of FIGS. 4B and 5 and additional reference is made to the time line of FIG. 6 and to various network scenarios depicted in FIGS. 7A–7F.

FIG. 7A

This scenario shows fault-free operation, wherein the bridge node 100C continually sends traffic along traffic channels 242 in the working group 240 and along traffic channels 262 in the protection group 260. The selector node 100H receives no AIS cells along the working APS channel 245 and thus forwards the traffic cells arriving on traffic channels 242 to end node 100B.

Figure 7A:
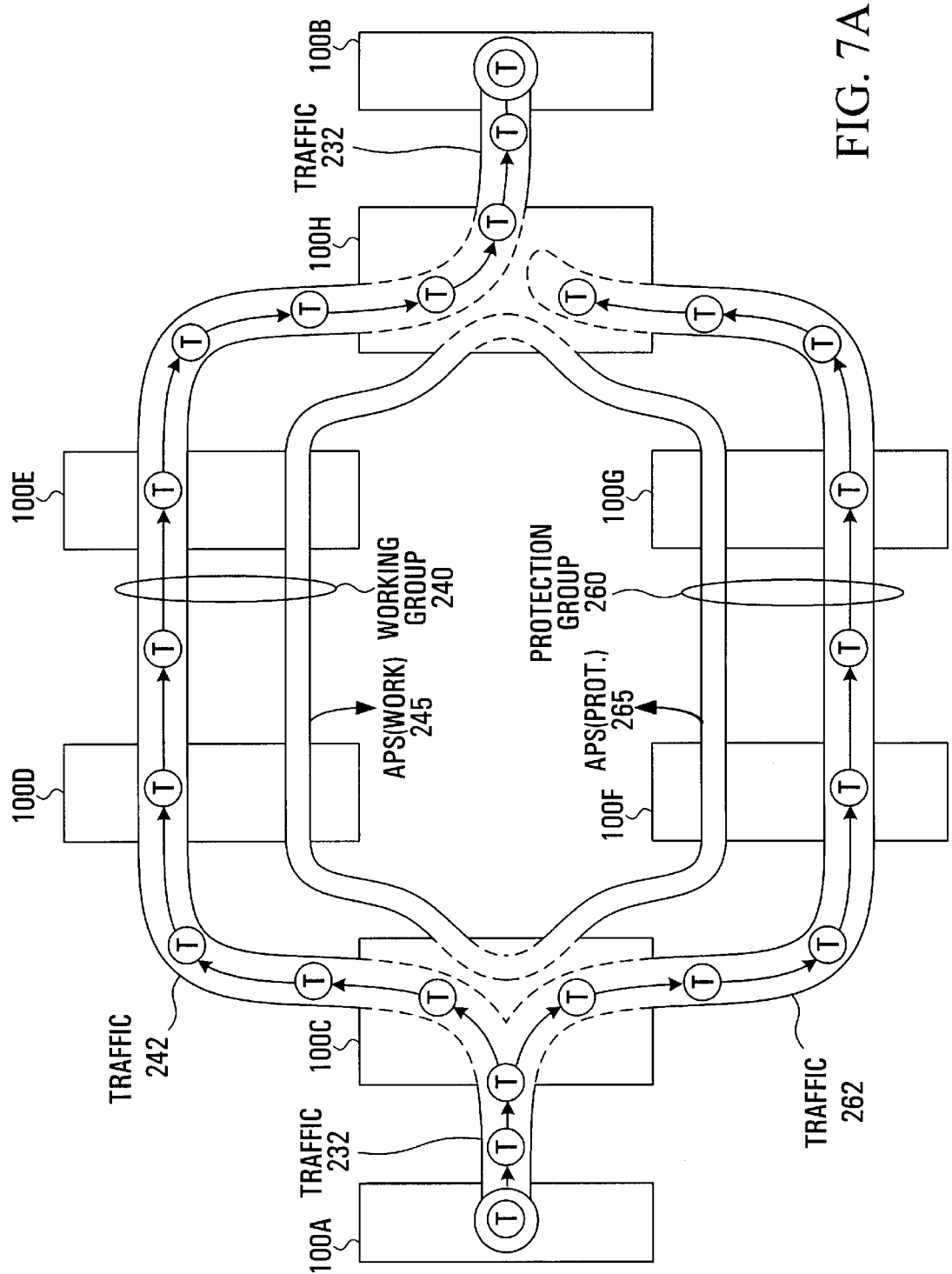
FIGS. 7A through 7F illustrate how various events on the time line of FIG. 6 affect the flow of traffic through the network.
Figure 7B:
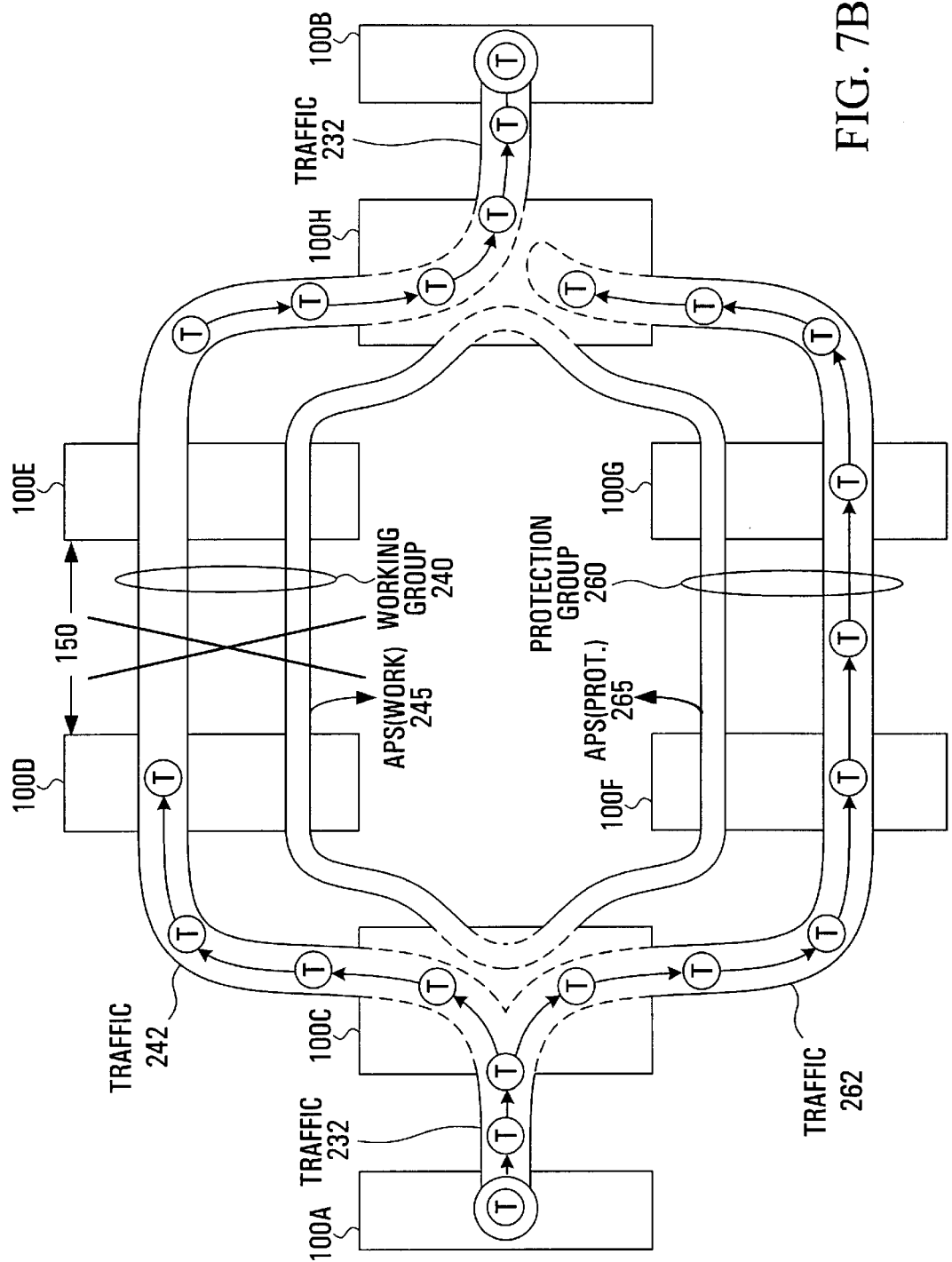

Time 602 and FIG. 7B:
  A failure occurs on link 150 carrying traffic channels 242 from intermediate node 100D to intermediate node 100E. Traffic channels 242 cease to contain end-to-end traffic.

Time 604
  Intermediate node 100E detects the failure (step 435 in FIG. 4B).

Figure 7C:
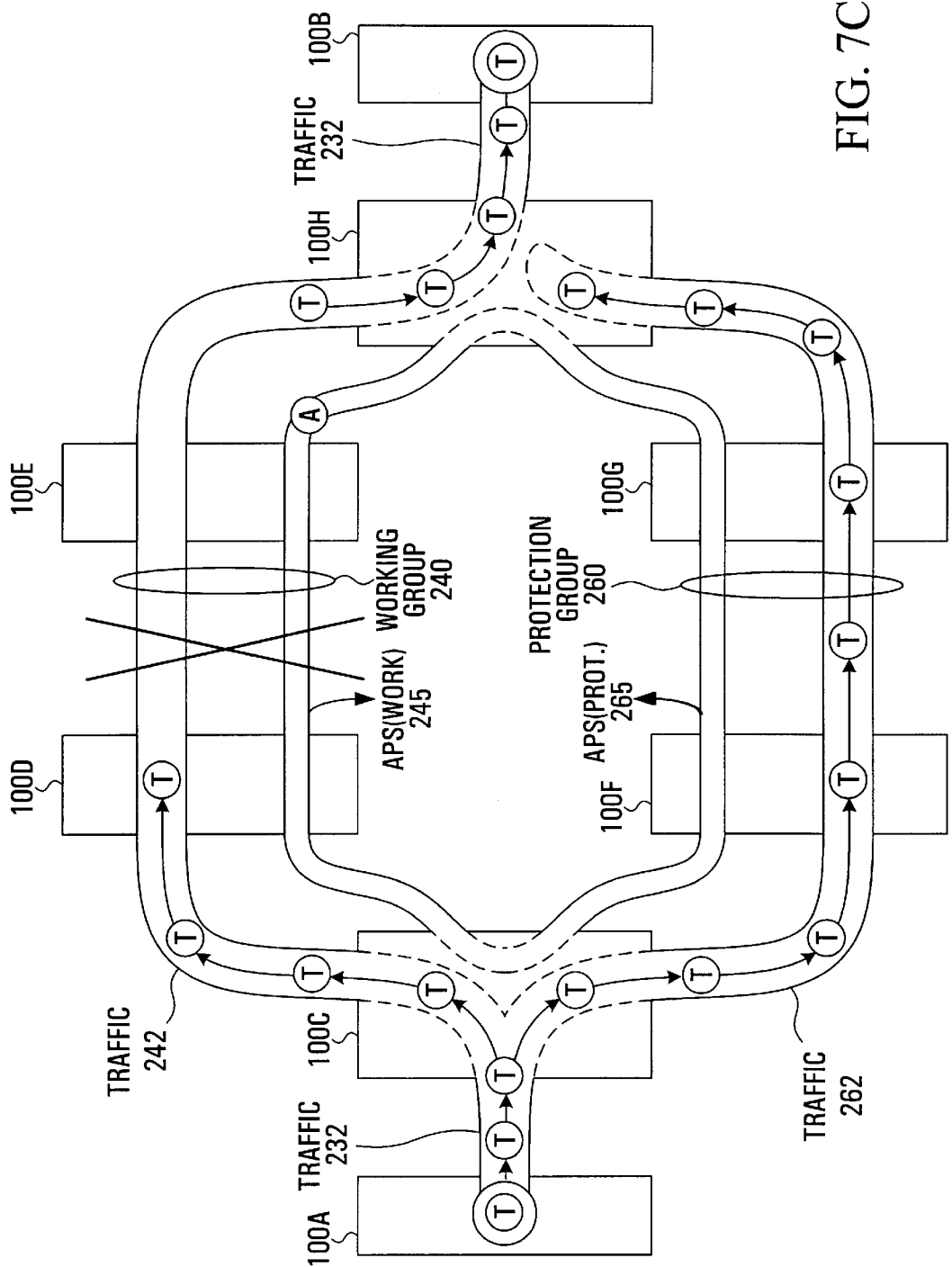

Time 606 and FIG. 7C
  Intermediate node 100E generates and sends an AIS cell along the high-priority working APS channel 245 (steps 445 and 455 in FIG. 4B).

Figure 7D:
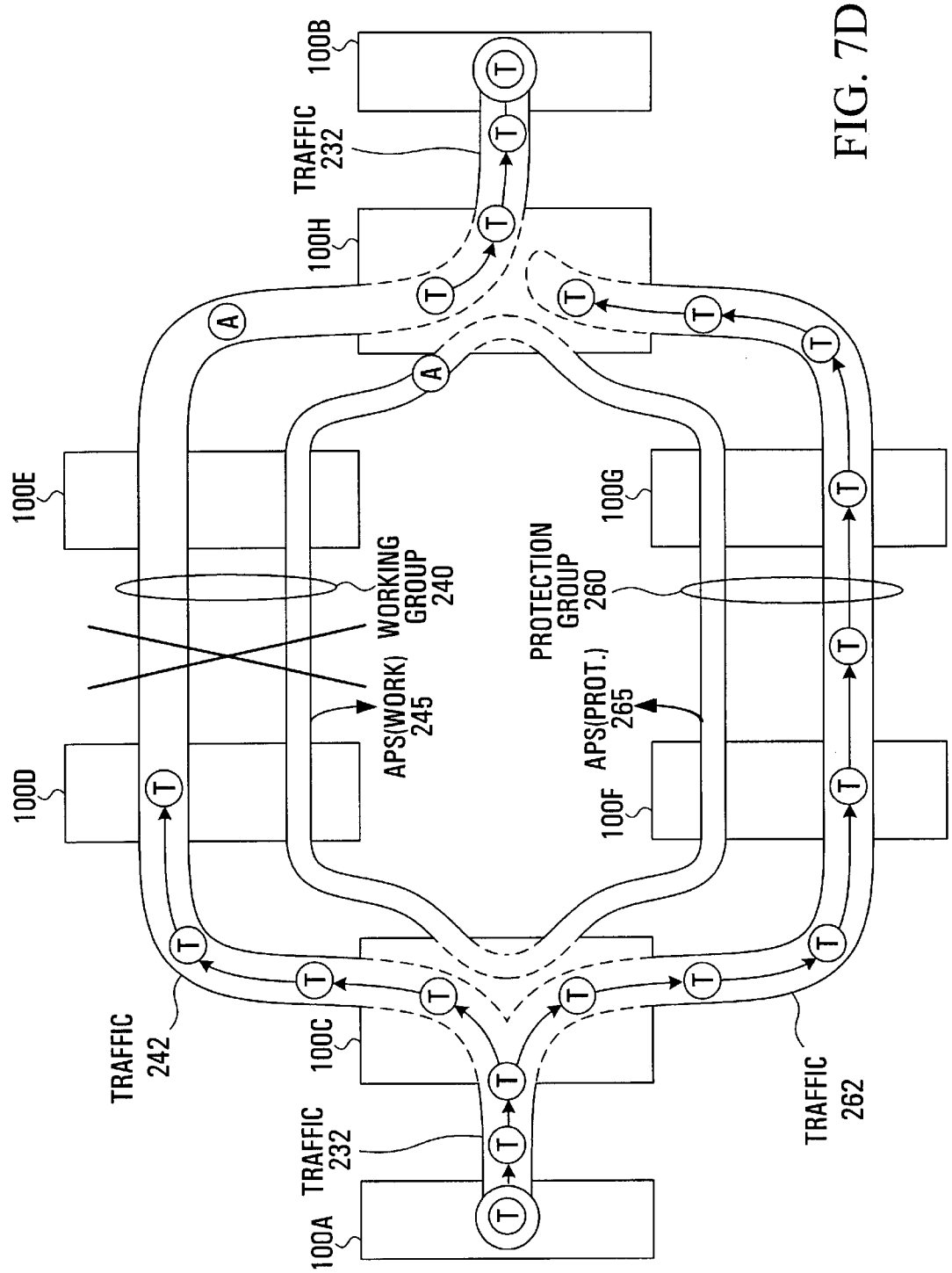

Time 608 and FIG. 7D:
  Intermediate node 100E sends AIS cells along traffic channels 242 (step 475 in FIG. 4B).

Figure 7E:
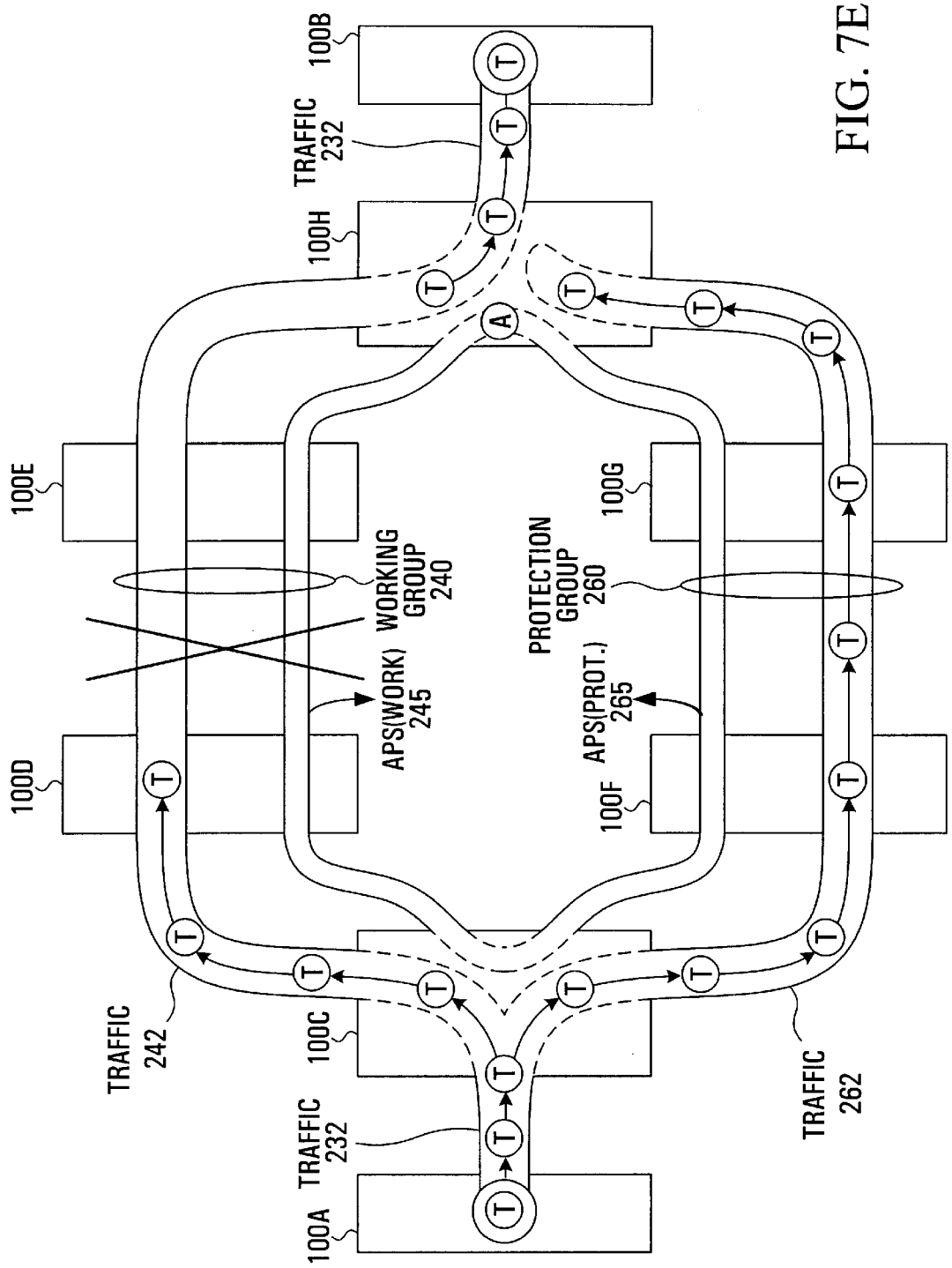

Time 610 and FIG. 7E:
  Selector node 100H receives the AIS cell sent by intermediate node 100E at time 606 (steps 510 and 520 in FIG. 5).

Time 612:
  The selector node 100H initiates protection switching (step 530 in FIG. 5).

Figure 7F:
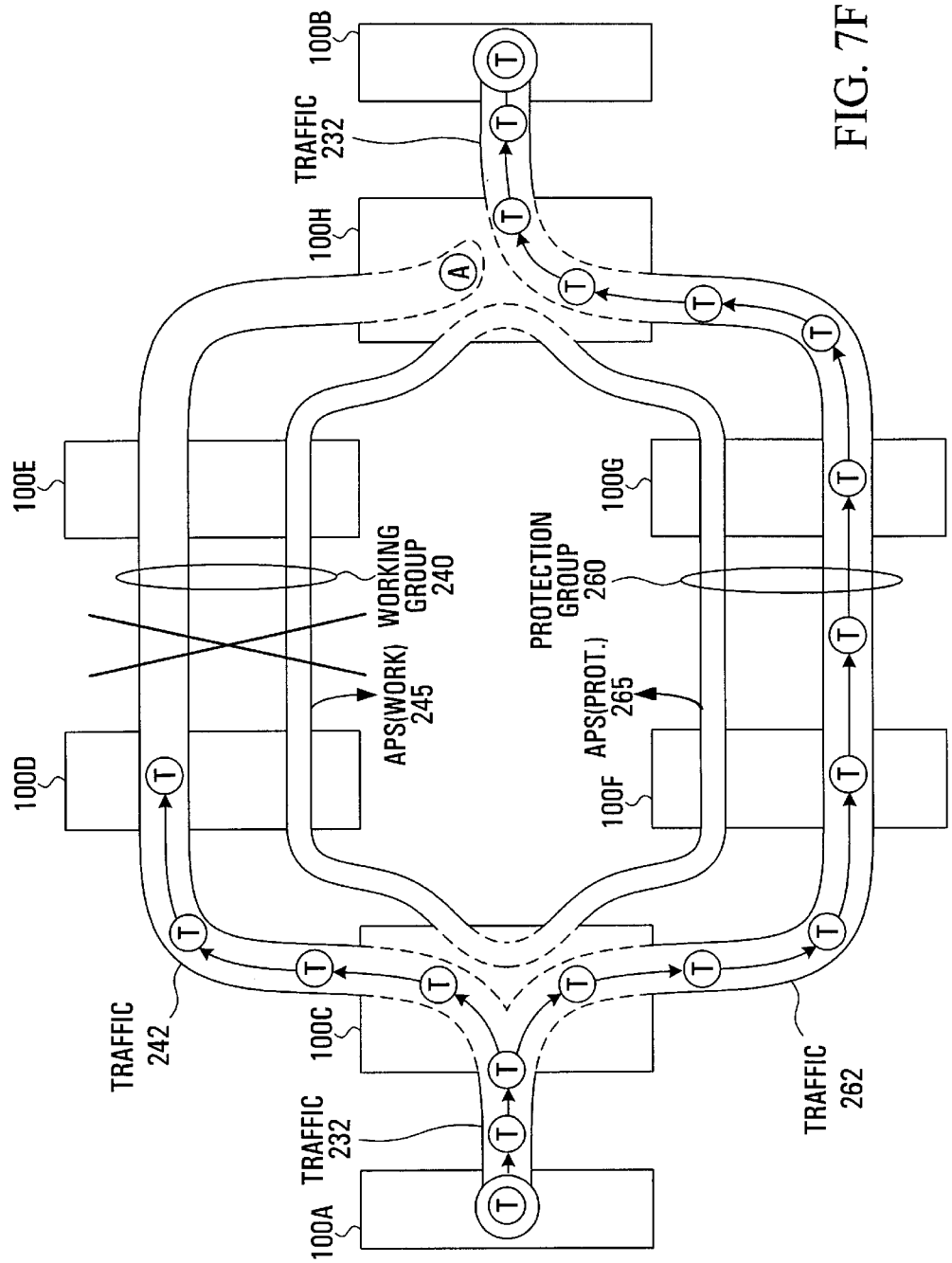

Time 614 and FIG. 7F:
  After completion of protection switching, the selector node 100H begins forwarding to end node 100B those traffic cells received from intermediate node 100G along the protection (lower) path. As none of the traffic channels 262 in the protection group 260 contain AIS cells, end node 100B will be unaware of any failure having occurred within the protected domain 50.

Time 616:
  The AIS cells carried by traffic channels 242 start to arrive at the selector node 100H but are discarded or ignored.

It is noted that because the working APS channel 245 is given a higher priority than any of the traffic channels 242 in the working group 240, sufficiently fast initiation and completion of protection switching prevents the propagation of AIS cells on traffic channels 232 located outside the realm of the protection domain 50.

If the entire protection switching operation takes somewhat longer to complete, then there will be a scenario (not shown, between FIG. 7E and FIG. 7F) where the traffic channels 232 will contain AIS cells. Nevertheless, this situation lasts for a period of time that is significantly less than that which would result from a conventional protection approach, since the invention guarantees at least the fast initiation of protection switching by virtue of the selector node 100H having received AIS cells along the high-priority working APS channel 265.

Thus, in the worst case scenario, the end node 100B receives AIS cells during a time interval which is so short that premature termination of the end-to-end connection is unlikely to occur.

In the above-described unidirectional 1+1 protection scenario, the protection APS channel 265 is not used. However, it may be beneficial for the selector node 100H to monitor the protection APS channel 265 during normal operating conditions in order to assess whether the protection path is available in case of failure of the working path.

Figure 8:
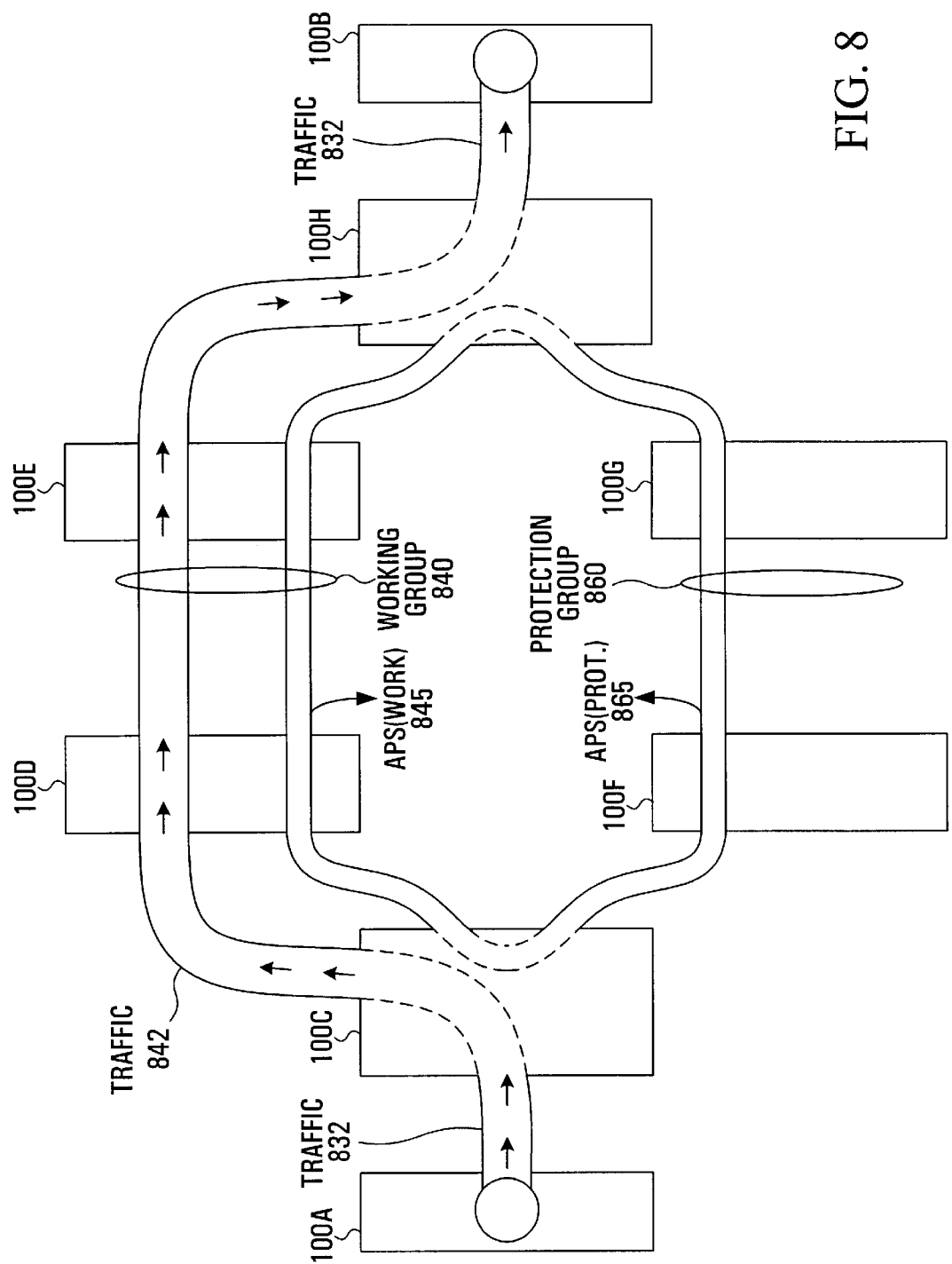
FIG. 8 is a logical view of the network in which channels are defined, for the case of 1:1 protection and unidirectional traffic flow.

Another situation in which the use of a high-priority APS channel is beneficial is in a 1:1 protection scenario, as now described in further detail with reference to FIG. 8. Thus, FIG. 8 shows, at the ATM layer, the flow of traffic from end node 100A to end node 100B in the case of a 1:1 protection scenario during normal operation. A plurality of traffic channels 832 starts at end node 100A and terminates at end node 100B. Within the protection domain 50, the traffic channels 832 travel as traffic channels 842 through intermediate nodes 100D and 100E in the working path. The traffic channels 842 are bundled into a working group 840, which also contains at least one working APS channel 845.

As in the case of 1+1 protection, the working APS channel 845 could be unidirectional (in the direction of traffic flow) or bi-directional. According to the preferred embodiment of the present invention, the working APS channel 845 is assigned a higher priority than any of the traffic channels 842 in the working group 840.

Also under normal operating conditions, a protection group 860 optionally travels through intermediate nodes 100F and 100G in the protection path. If it exists under normal operating conditions of a 1:1 protection scenario, the protection group 860 does not consists of traffic channels and might consist only of a protection APS channel 865. The protection APS channel 865 could be unidirectional (in the direction from selector node 100H to bridge node 100C) or bi-directional. Preferably, the protection APS channel 865 is assigned the highest possible priority.

Operation of the various network elements in the protected domain 50 is now described for the case of a 1:1 protection scenario. Those skilled in the art will recognize that the actions to be described herein below as being taken by a particular network element can easily be programmed into the software or firmware at the appropriate network element. Alternatively, it is possible to design a set of hardware gates in order to perform the desired sequence of steps.

Under normal operating conditions, the bridge node 100C accepts cells arriving from end node 100A along traffic channels 832. These cells are sent onto traffic channels 842 in the working group 840. Also under normal operating conditions, the selector node 100H receives traffic cells from intermediate node 100E along traffic channels 842. These traffic cells are forwarded to end node 100B along traffic channels 232, which lie outside the protected domain 50.

Figure 9:
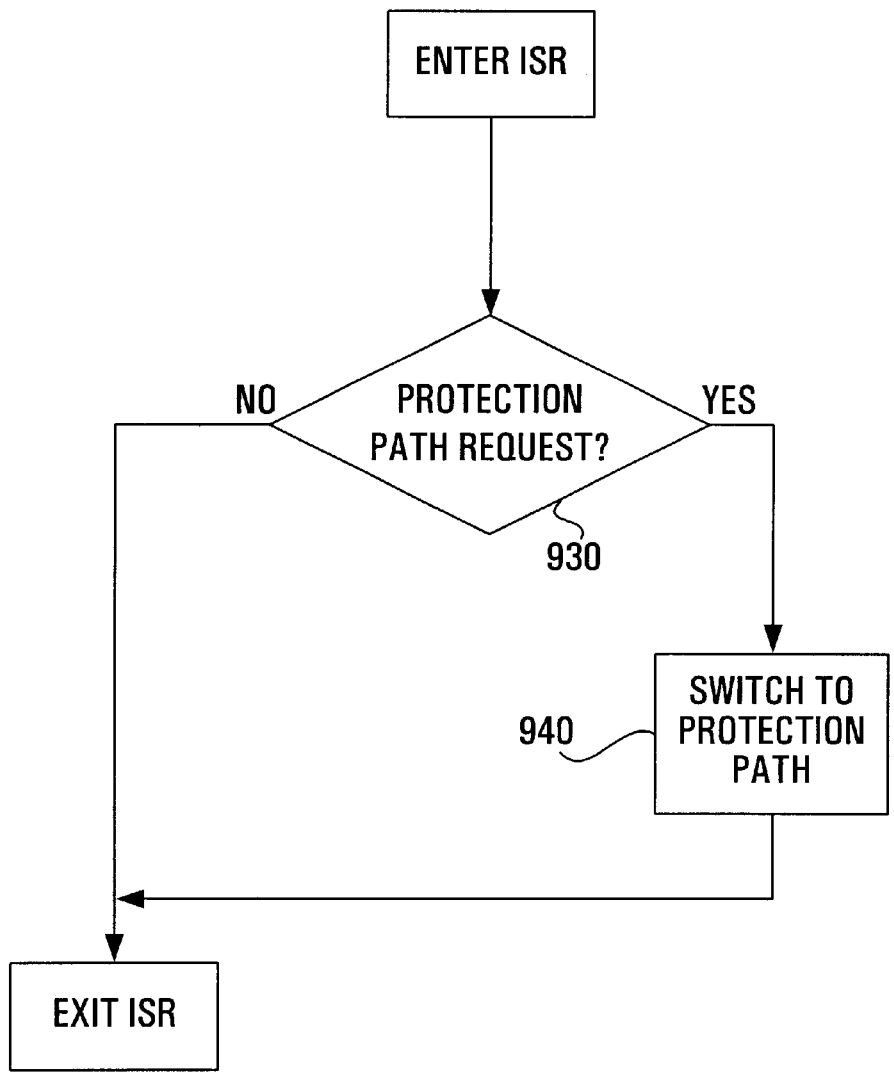
FIG. 9 is a flowchart illustrating operation of a bridge node in a 1:1 protection scenario, according to the preferred embodiment of the invention.

Normal behaviour of the bridge node 100C in a 1:1 protection scenario may be interrupted by receipt of a message requesting use of the protection path to send traffic. Such a request message may originate from the selector node 100H under conditions to be described herein below. Normal operation of the selector node 100H itself may be interrupted by the arrival of cells on the working APS channel 845 or on the protection APS channel 865. FIG. 9 shows a flowchart of an interrupt service routine illustrating operation of the bridge node 100C when interrupted, while FIG. 10 illustrates operation of the selector node 100H upon interruption of its normal operating cycle.

With reference to FIG. 9, at step 930, the bridge node 100C checks whether the interrupt is the result of having received a protection path request message along the protection APS channel. If so, the bridge node 100C then switches to the protection path (step 940). For example, this can be done by the bridge node 100C adding traffic channels to the protection group 860 and subsequently beginning to place the traffic cells received via traffic channels 832 onto the newly created traffic channels in the protection group 860.

Figure 10:
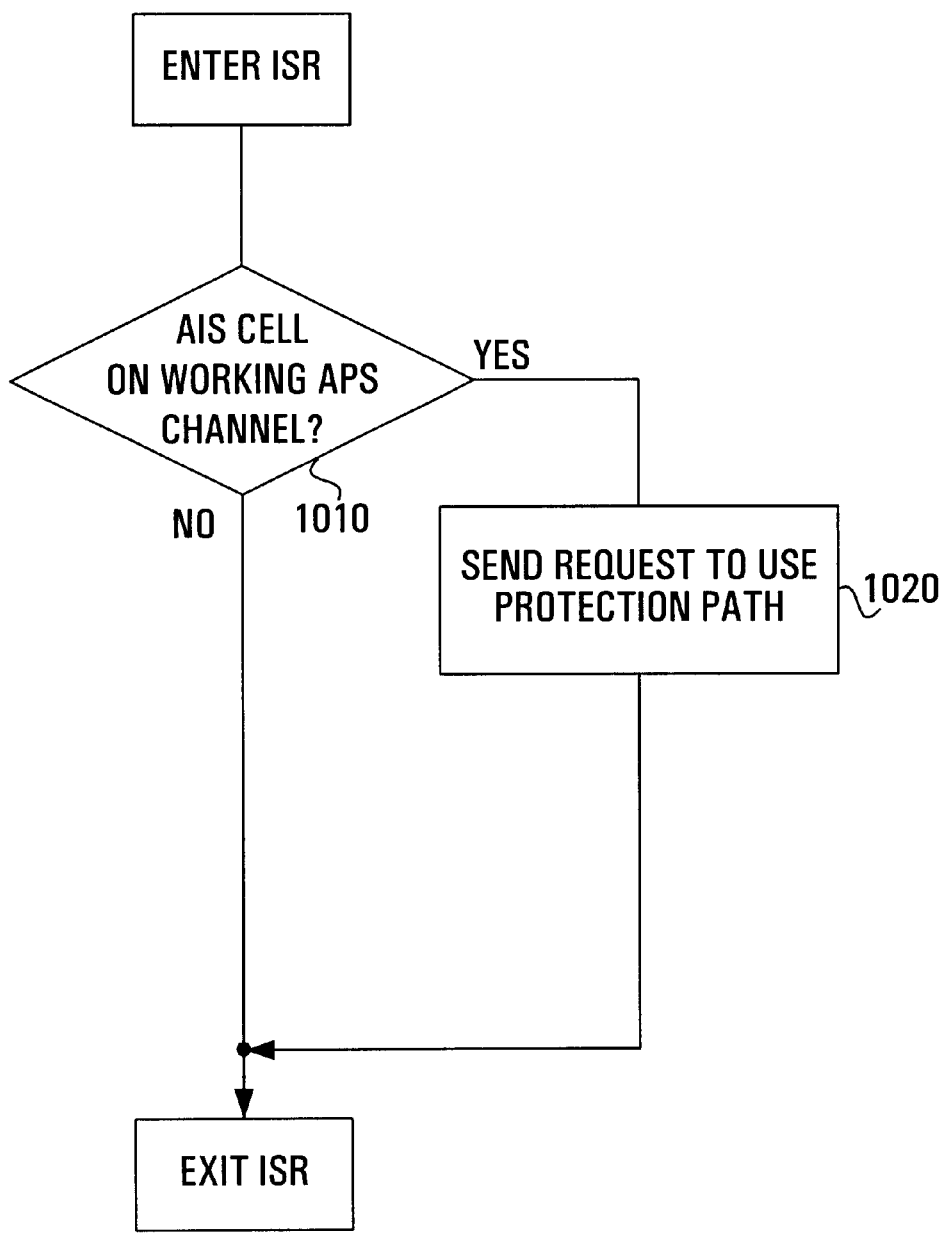
FIG. 10 is a flowchart illustrating operation of a selector node in a 1:1 protection scenario, according to the preferred embodiment of the invention.

With reference to FIG. 10, at step 1010, the selector node 100H is interrupted by the arrival of a cell and checks to see whether the cell is an AIS cell on the working APS channel 245. If so, then the selector node initiates protection switching. This can be done by the selector node 100H sending a message requesting the use of the protection path along the protection APS channel 865 (step 1040). The circuitry and/or software in the selector node 100H is then instructed to begin accepting cells received on the traffic channels 862 in the protection group 860 and forwarding these cells to end node 100B.

Finally, intermediate nodes 100D and 100E in the working path operate the same way for a 1:1 protection scenario as they do for the previously described 1+1 protection scenario. On the other hand, intermediate nodes 100F and 100G in the protection path operate in a slightly different manner. Specifically, intermediate nodes 100F and 100G only receive traffic if such traffic is sent by the bridge node 100C, i.e., after the bridge node 100C responds to a message requesting for use of the protection path. Furthermore, intermediate nodes 100F and 100G receive protection path request messages from the selector node 100H and forward these messages in the direction of the bridge node 100C along the protection APS channel 865.

Figure 11:
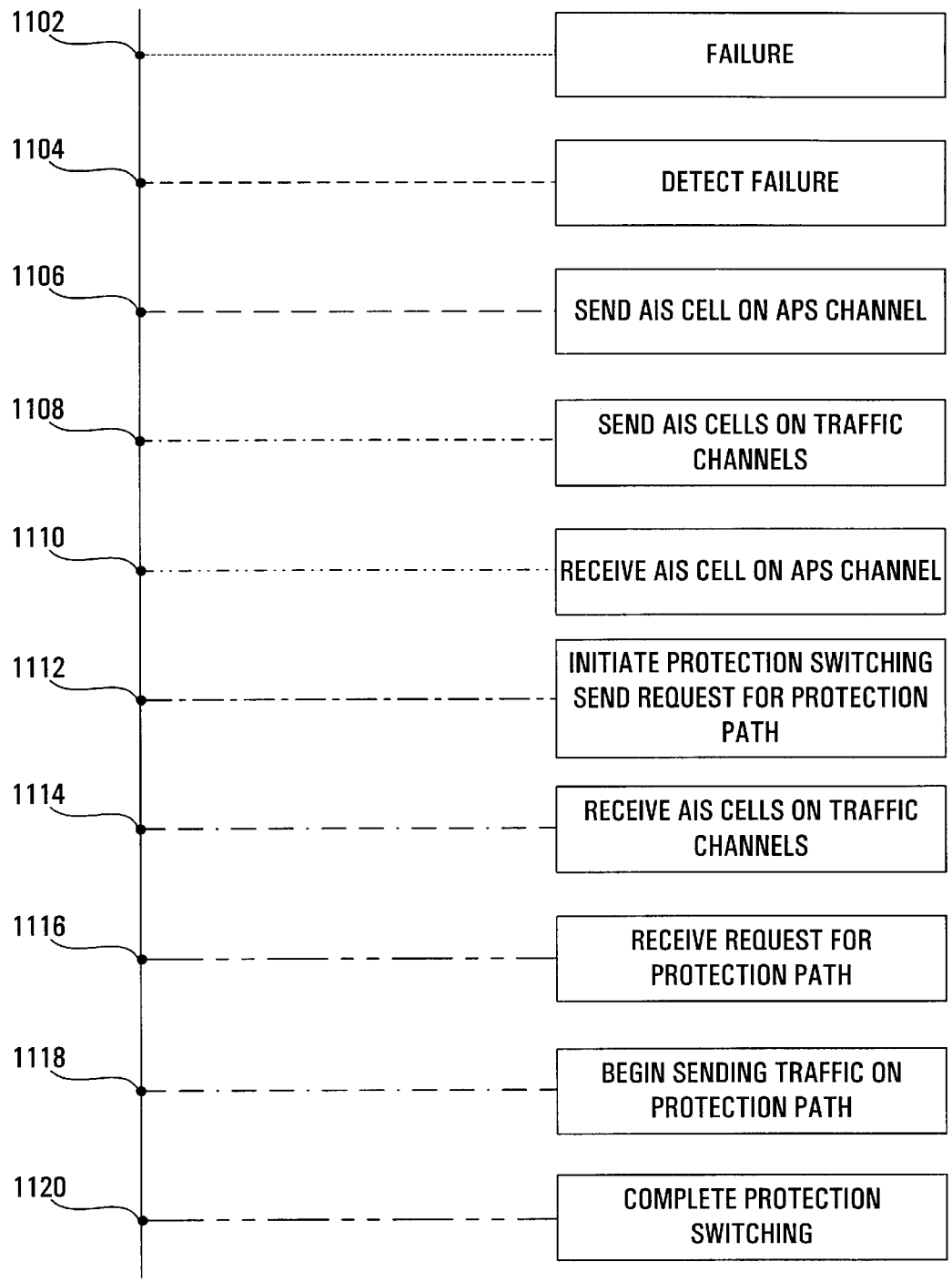
FIG. 11 is a time line illustrating operation of various nodes in the protected domain after occurrence of a fault in a 1:1 protection scenario, according to the preferred embodiment of the invention.

The benefits of the present invention in the case of a 1:1 protection scenario will now become apparent upon consideration of joint operation of the various nodes in the protection domain 50. To this end, continued reference is made to the flowchart of FIGS. 9 and 10 and additional reference is made to the time line of FIG. 11 and to various network scenarios depicted in FIGS. 12A–12I.

FIG. 12A

This shows fault-free operation, wherein the bridge node 100C continually sends traffic along the traffic channels 842 in the working group 840. The selector node 100H receives no AIS cells along the working APS channel 845 and thus forwards traffic cells arriving on traffic channels 842 in the direction of end node 100B.

Figure 12A:
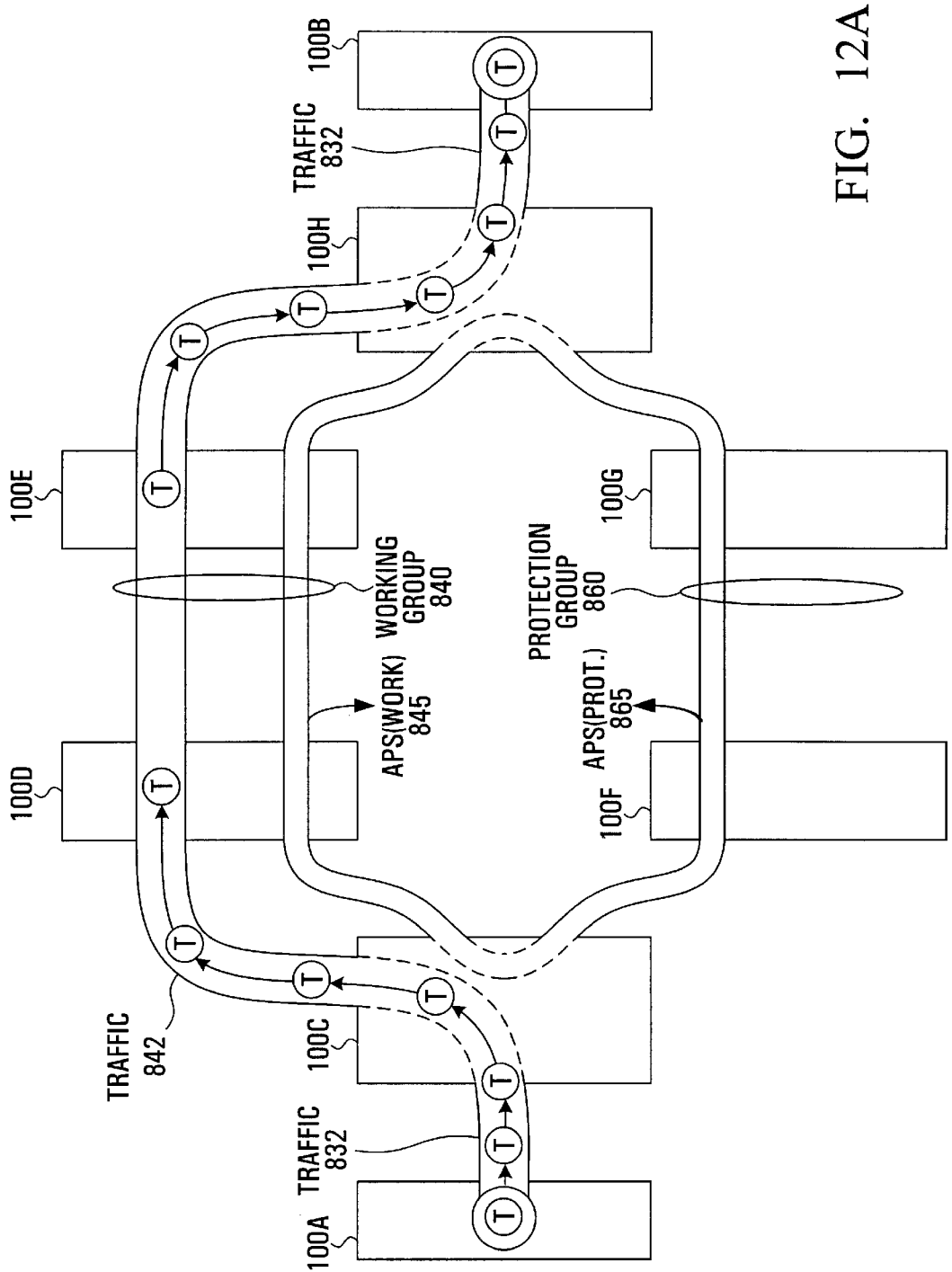
FIGS. 12A through 12I illustrate how various events on the time line of FIG. 11 affect the flow of traffic through the network.
Figure 12B:
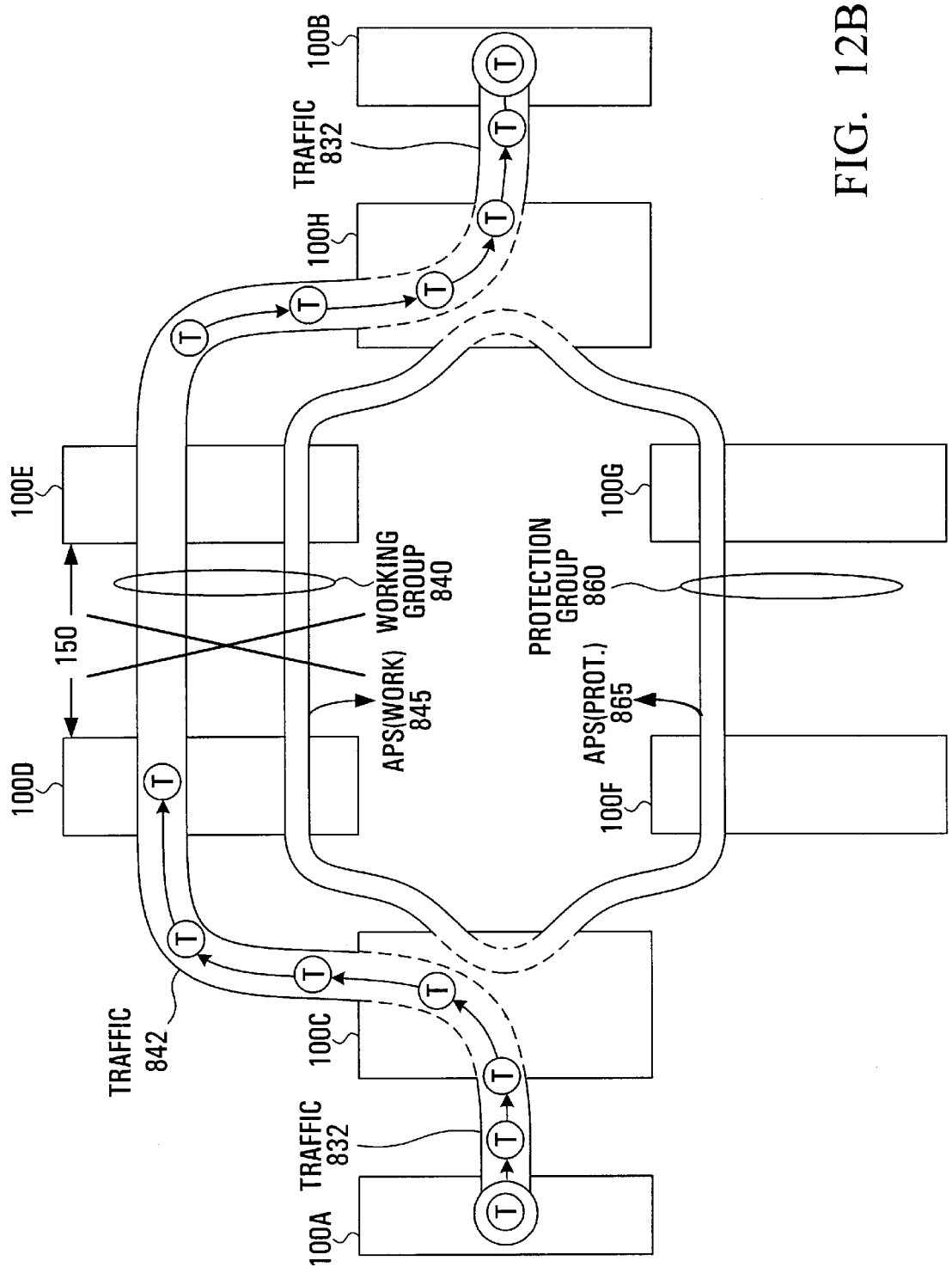

Time 1102 and FIG. 12B:

A failure occurs on link 150 carrying traffic channels 842 from intermediate node 100D to intermediate node 100E. Traffic channels 842 cease to contain end-to-end traffic.

Time 1104

Intermediate node 100E detects the failure.

Figure 12C:
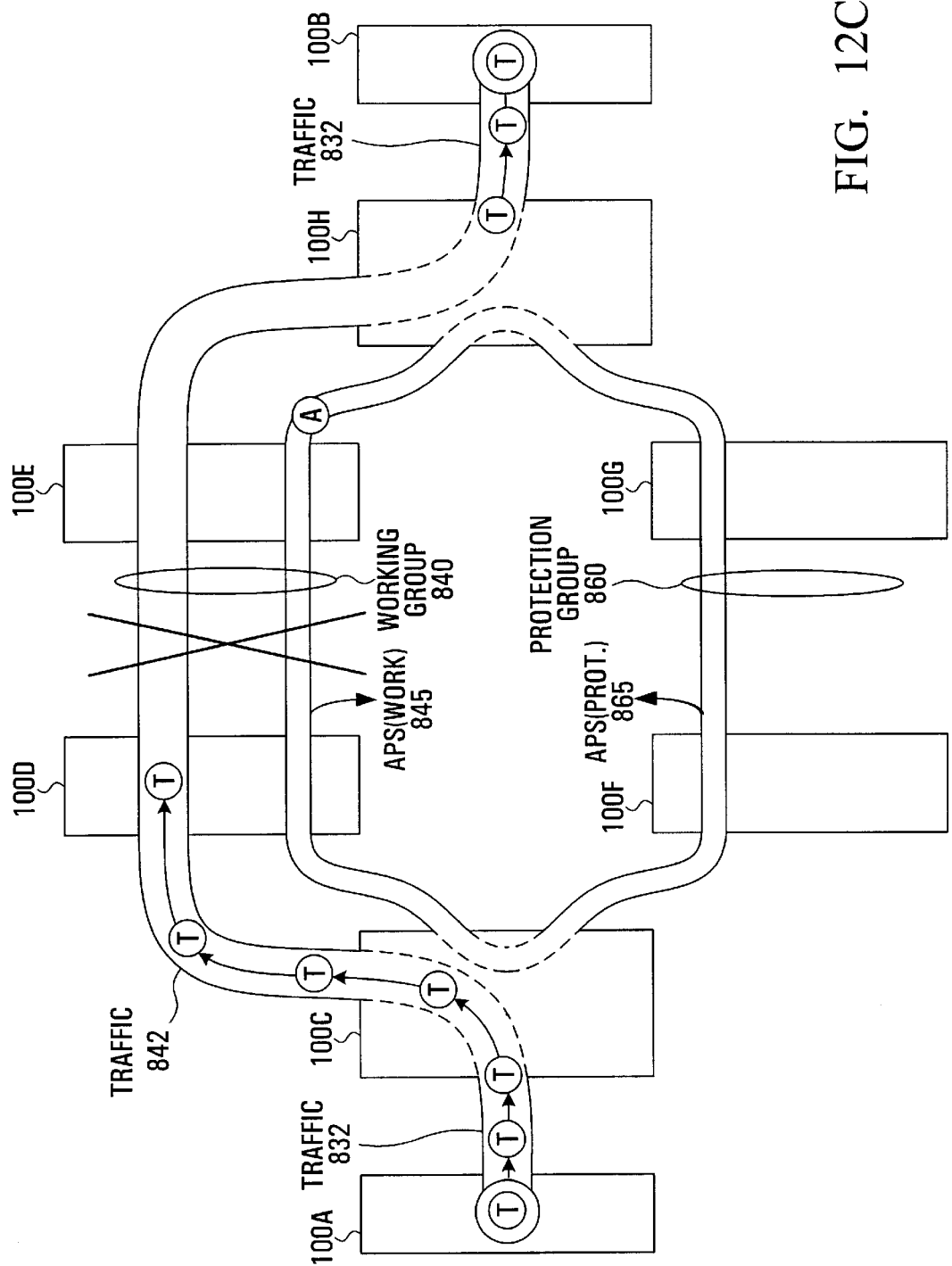

Time 1106 and FIG. 12C

Intermediate node 100E generates and sends an AIS cell along the high-priority working APS channel 845.

Figure 12D:
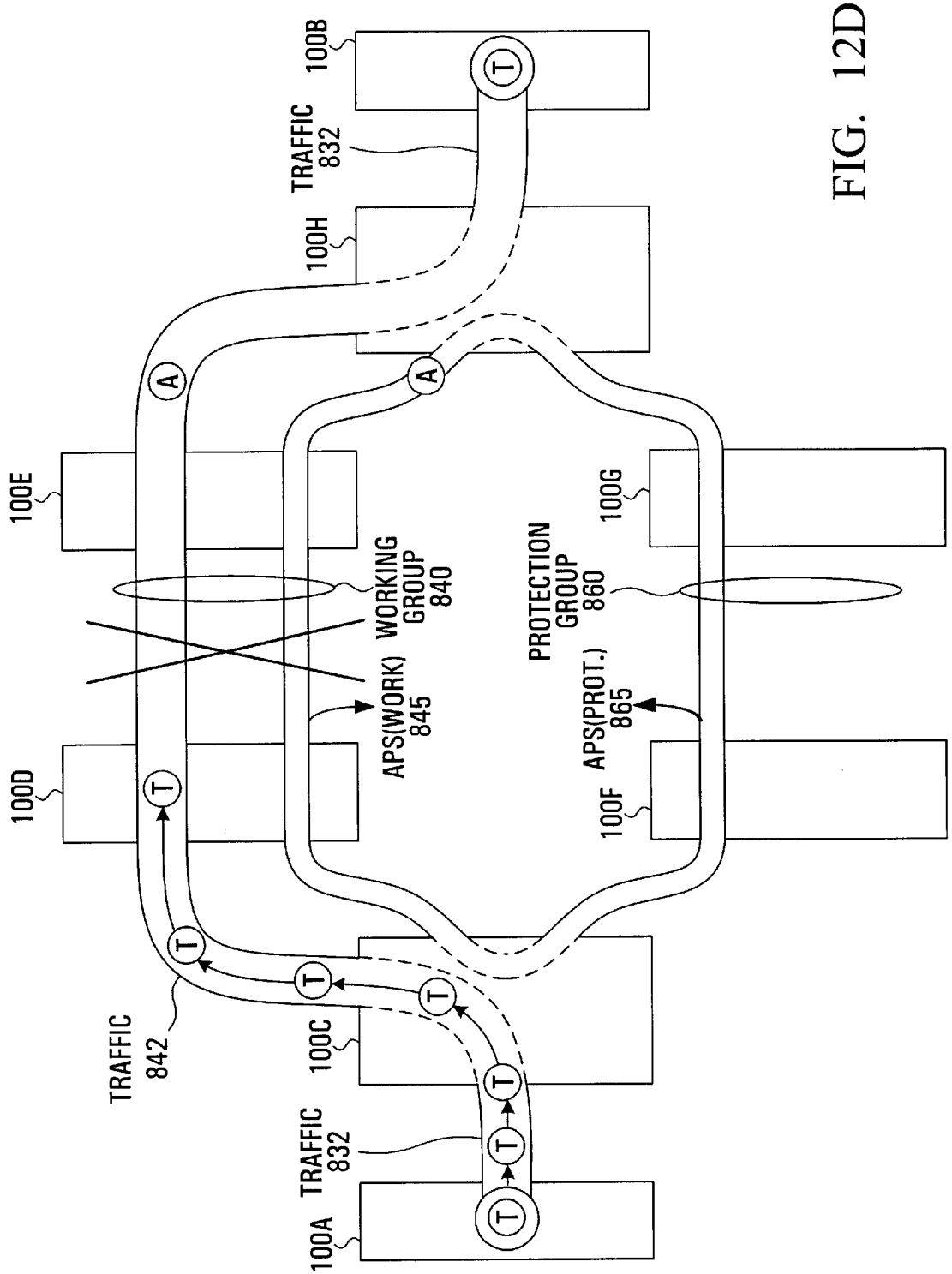

Time 1108 and FIG. 12D:

Intermediate node 100E sends AIS cells along traffic channels 842.

Figure 12E:
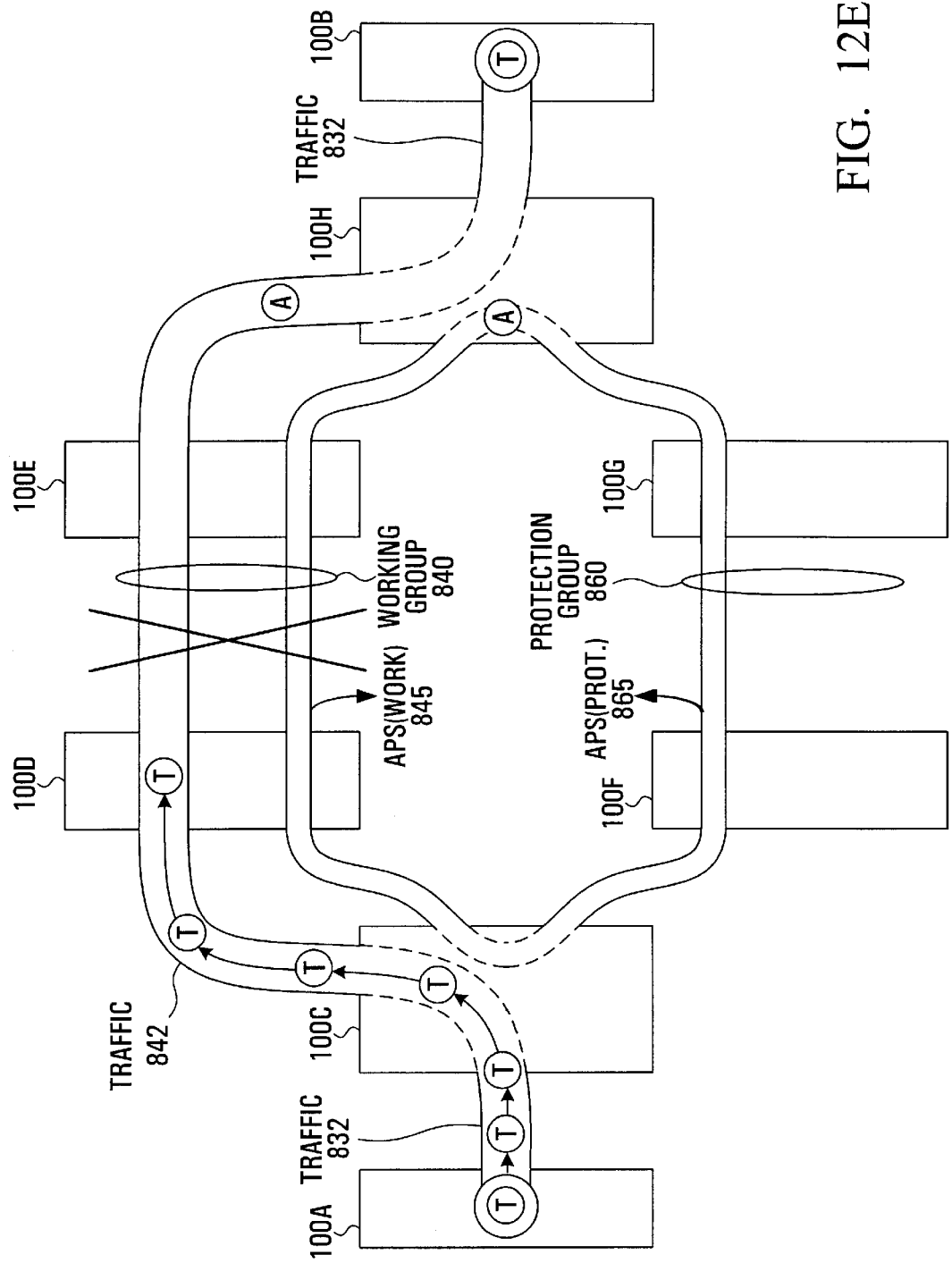

Time 1110 and FIG. 12E:

Selector node 100H receives the AIS cells sent by intermediate node 100E at time 1106 (step 1010 in FIG. 10).

Figure 12F:
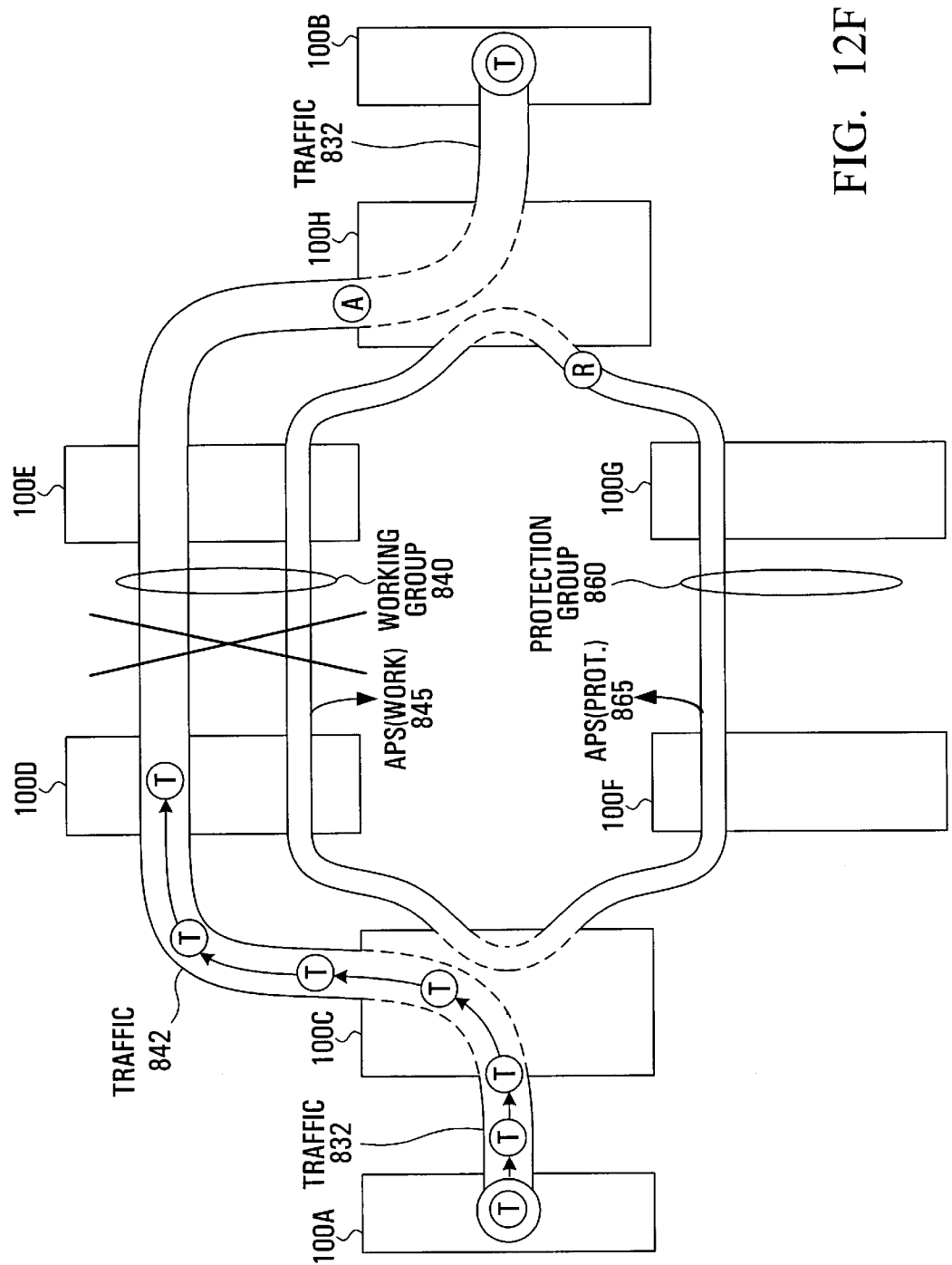

Time 1112 and FIG. 12F:

The selector node 100H initiates protection switching and sends a message requesting use of the traffic channels in the protection path (step 1020 in FIG. 10). This request message is sent along the protection APS channel. The selector node 100H keeps using traffic channels 842 in the working group 840 until protection switching is complete.

Time 1114:

The AIS cells carried by traffic channels 842 start to arrive at the selector node 100H and are forwarded to end node 100B.

Figure 12G:
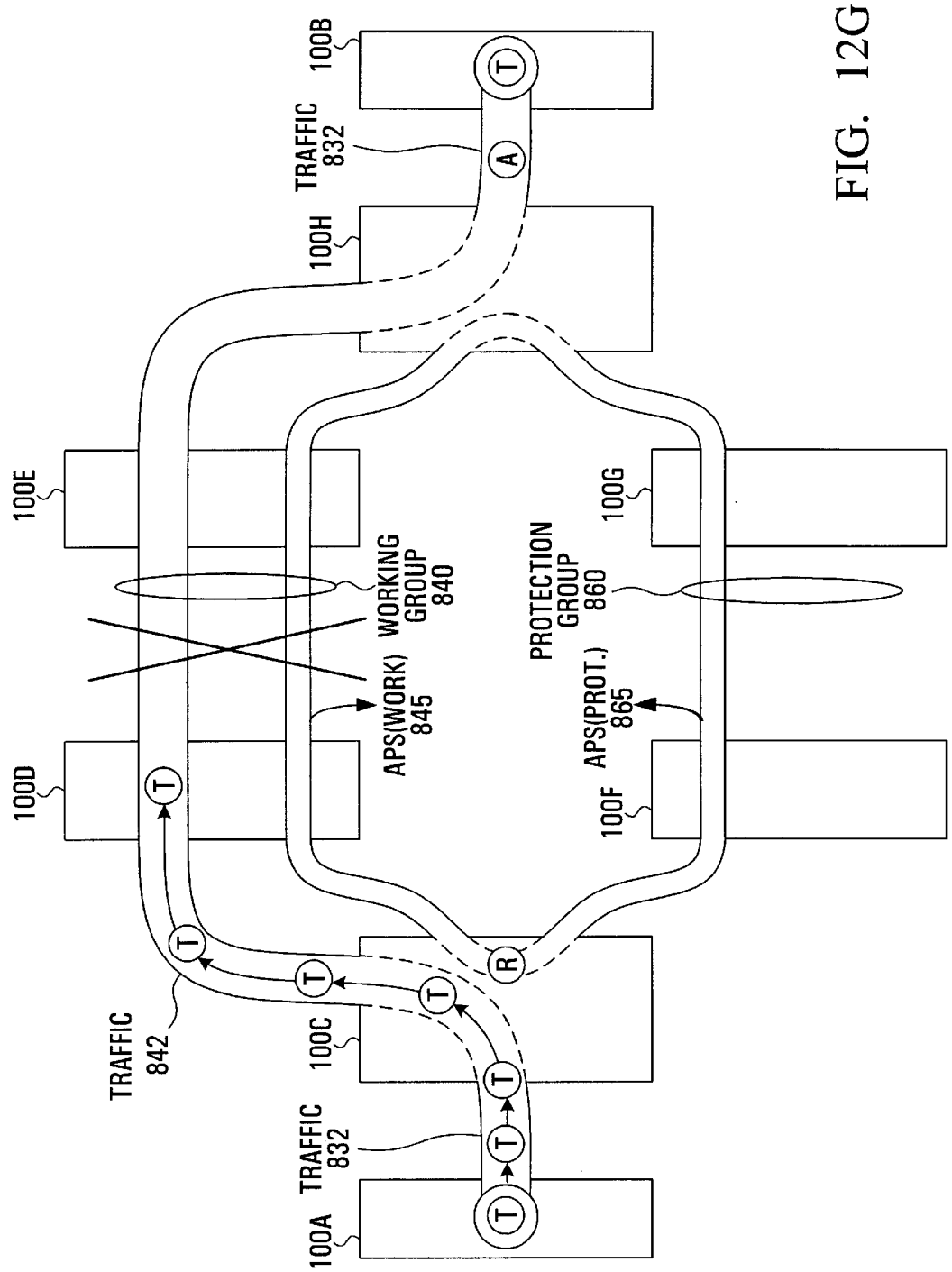

Time 1116 and FIG. 12G:

The bridge node 100C receives the message requesting use of the protection path (step 930 in FIG. 9).

Figure 12H:
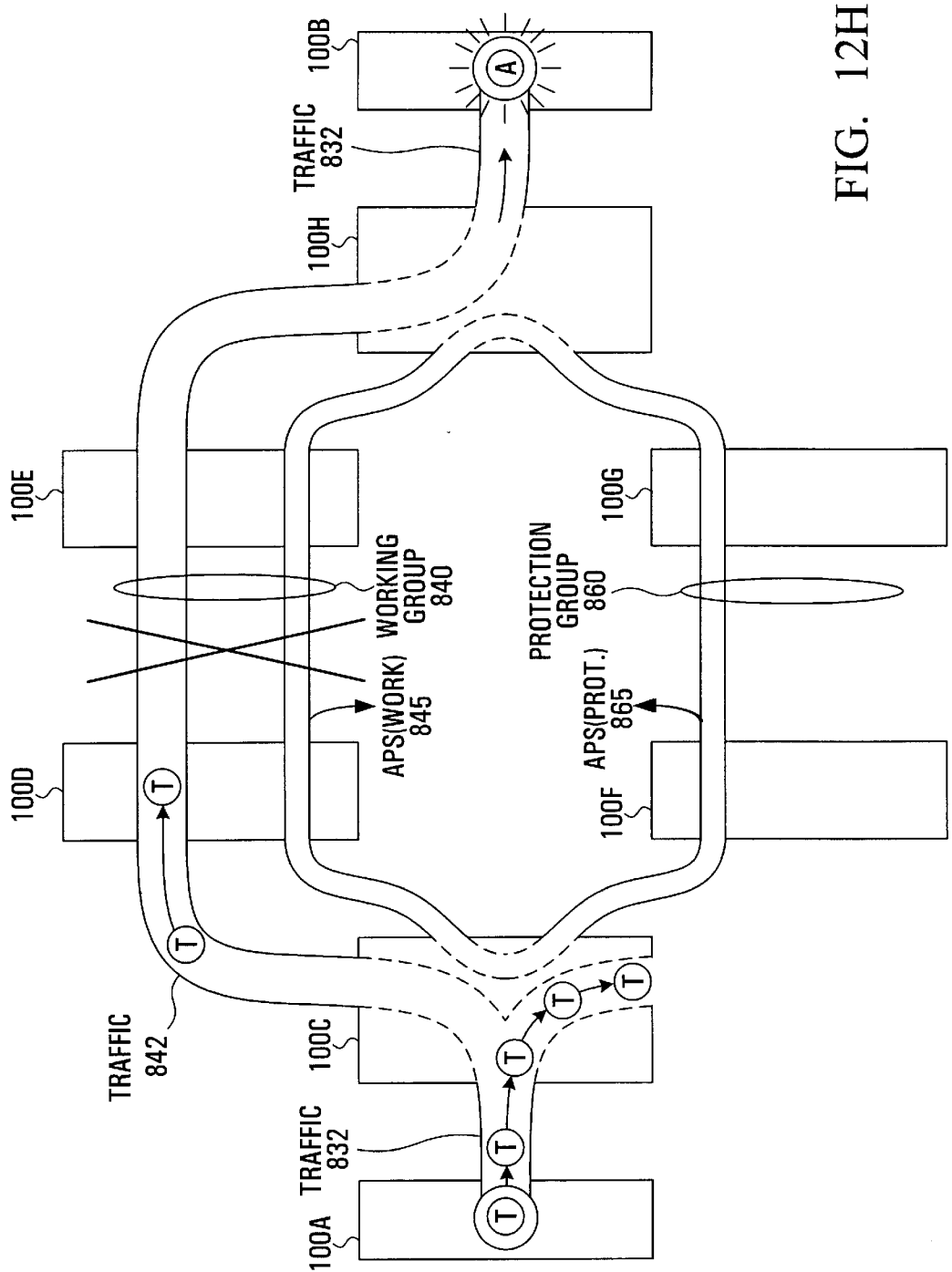

Time 1118 and FIG. 12H:

The bridge node 100C begins sending traffic along the protection path, i.e., in the form of traffic channels in the protection group 860 (step 940 in FIG. 9).

Figure 12I:
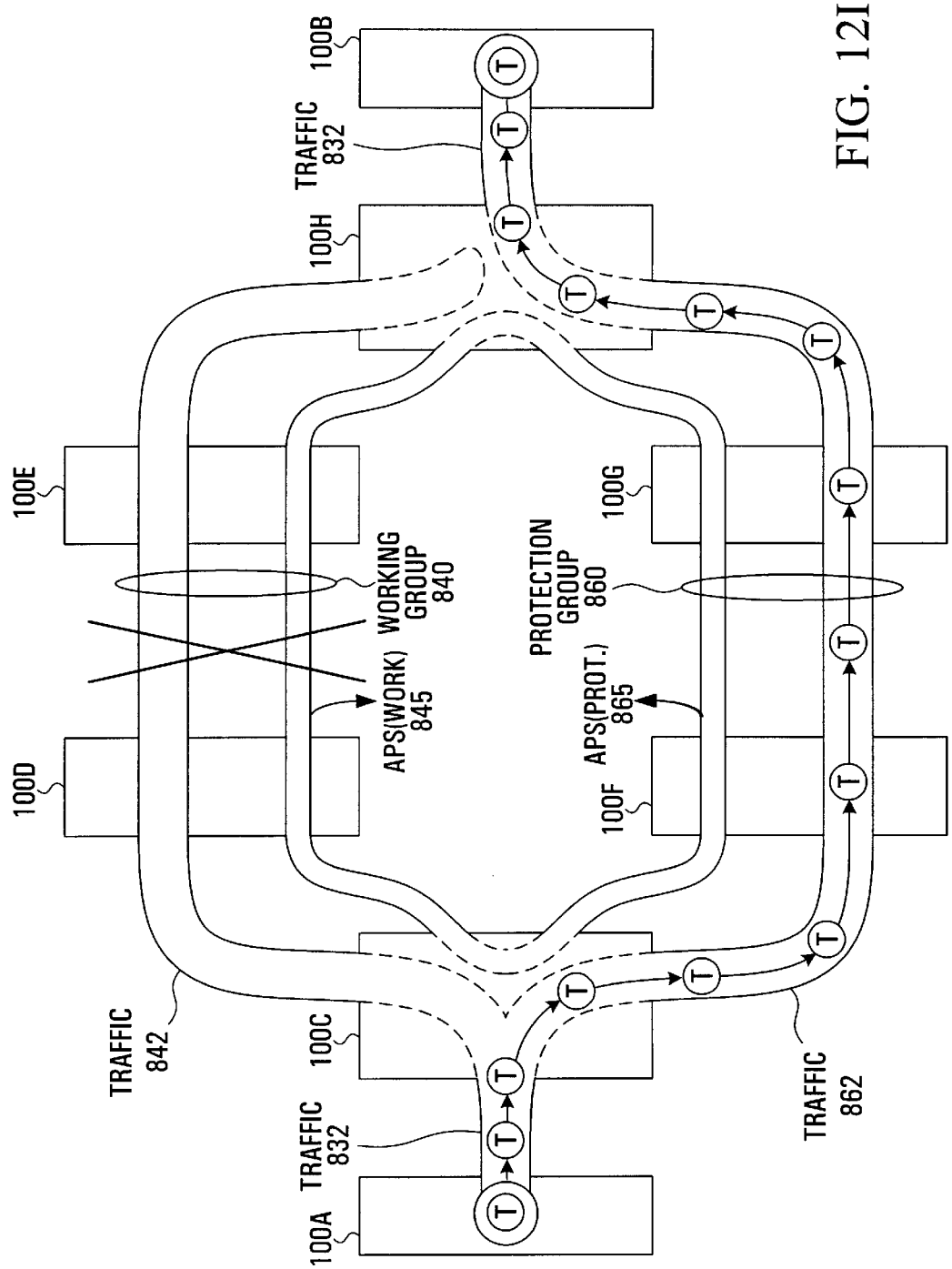

Time 1120 and FIG. 12I:

Protection switching is complete and the selector node 100H begins accepting traffic cells received from intermediate node 100G along the traffic channels in the protection group 860. These traffic cells are forwarded to end node 100B along traffic channels 832. The traffic channels 832 forwarded in this manner do not contain AIS cells.

It is noted that because the working APS channel 845 is given a higher priority than any of the traffic channels 842 in the working group 842, protection switching can be initiated by the selector node 100H prior to the receipt of AIS cells on traffic channels 842. While there is be a period (FIGS. 12G through 12I) during which the traffic channels 832 contain AIS cells, fast initiation of protection switching allows this period to be significantly reduced relative to that resulting from a conventional protection switching approach.

As a result, the end node 100B receives AIS cells during only a short time interval, which advantageously helps prevent premature termination of the end-to-end connection.

While the preferred embodiment of the present invention has been described and illustrated, it will be apparent to those skilled in the art that numerous modifications and variations can be made without departing from the scope of the invention as defined in the appended claims.

I claim:

1. A method of protecting a group of traffic channels travelling through a protected domain comprising a bridge node, a selector node and a plurality of other nodes arranged in a working path and in a protection path between the bridge node and the selector node, the method comprising:

upon a node in the working path detecting failure of the traffic channels, said node transmitting failure information to the selector node along the traffic channels and along an alarm channel in the working path; and upon receipt of said failure information by the selector node along said alarm channel, the selector node initiating protection switching of the traffic channels;

wherein said alarm channel has a sufficiently high priority relative to the traffic channels to allow the selector node to initiate protection switching before failure information is received along any of the traffic channels.

2. The method of claim 1, wherein said traffic channels contain ATM virtual path connections or virtual channel connections.

3. The method of claim 1, wherein said alarm channel is an ATM virtual path connection or virtual channel connection.

4. The method of claim 2, wherein said alarm channel is an ATM virtual path connection or virtual channel connection.

5. The method of claim 4, wherein the virtual path connections and the virtual channel connections are carried by a SONET transport layer.

6. The method of claim 4, wherein the traffic channels and the alarm channel form part of a virtual path group or virtual channel group.

7. The method of claim 1, wherein prior to failure detection, the traffic channels travel through the protected domain along both the working path and the protection path and wherein the selector node performs protection switching by selecting the traffic channels arriving along the protection path.

8. The method of claim 7, wherein said alarm channel has a sufficiently high priority relative to the traffic channels to allow the selector node to complete protection switching before failure information is received on any of the traffic channels.

9. The method of claim 1, wherein prior to failure detection, the traffic channels travel through the protected domain along only the working path and wherein protection switching is performed by the selector node transmitting a message to the bridge node along a second alarm channel in the protection path, the bridge node receiving the message and responding thereto by sending the traffic channels along the protection path and the selector node selecting the traffic channels arriving along the protection path.

10. The method of claim 9, wherein the first and second alarm channels are ATM virtual path connections or virtual channel connections.

11. The method of claim 10, wherein the virtual path connections and the virtual channel connections are carried by a SONET transport layer.

12. The method of claim 1, wherein the working and protection paths are physically diverse.

13. A protected domain for carrying traffic channels therethrough, comprising:

a plurality of working intermediate nodes arranged in a working path, the working intermediate nodes being adapted to transmit, upon detecting failure of the traffic channels, node failure information along the traffic channels and along an alarm channel in the working path; and a plurality of protection intermediate nodes arranged in a protection path;

a bridge node connected to a first one of the working intermediate nodes and to a first one of the protection intermediate nodes, the bridge node being adapted to send the traffic channels to both the first working node and the first protection node; and a selector node connected to a second one of the working intermediate nodes and to a second one of the protection intermediate nodes, the selector node being adapted to select, under normal operating conditions, the traffic channels received from the second working intermediate node, the selector node being further adapted to initiate protection switching of the traffic channels upon receipt of said failure information along said alarm channel, said protection switching comprising the selector node selecting the traffic channels received from the second protection intermediate node;

wherein said alarm channel has a sufficiently high priority relative to the traffic channels to permit initiation of protection switching before failure information is received by the selector node on any of the traffic channels.

14. A protected domain for carrying traffic channels therethrough, comprising:

a plurality of working intermediate nodes arranged in a working path, the working intermediate nodes being adapted to transmit, upon detecting failure of the traffic channels, node failure information along the traffic channels and along an alarm channel in the working path; and a plurality of protection intermediate nodes arranged in a protection path;

a bridge node connected to a first one of the working intermediate nodes and to a first one of the protection intermediate nodes, the bridge node being adapted to send the traffic channels to the first working node under normal operating conditions or to the first protection node under failure conditions; and a selector node connected to a second one of the working intermediate nodes and to a second one of the protection intermediate nodes, the selector node being adapted to select, under normal operating conditions, the traffic channels received from the second working intermediate node, the selector node being further adapted to initiate protection switching of the traffic channels upon receipt of said failure information along said alarm channel;

wherein protection switching comprises the selector node sending a protection path request message to the bridge node along a second alarm channel in the protection path, the bridge node receiving the protection path request message and responding by sending the traffic channels to the first protection intermediate node and the selector node selecting the traffic channels arriving from the second protection intermediate node after a predetermined amount of time;

wherein said alarm channel has a sufficiently high priority relative to the traffic channels to permit initiation of protection switching before failure information is received by the selector node on any of the traffic channels.

* * * * *